United States Patent
Ogata et al.

(10) Patent No.: US 8,387,587 B2
(45) Date of Patent: Mar. 5, 2013

(54) CONTROL UNIT FOR DIRECT INJECTION ENGINE

(75) Inventors: Kenichiroh Ogata, Hitachinaka (JP); Yoshihiro Sukegawa, Hitachi (JP); Kengo Kumano, Hitachinaka (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 129 days.

(21) Appl. No.: 13/028,298

(22) Filed: Feb. 16, 2011

(65) Prior Publication Data
US 2011/0226214 A1    Sep. 22, 2011

(30) Foreign Application Priority Data
Mar. 17, 2010 (JP) .................. 2010-060100

(51) Int. Cl.
*F02B 3/00* (2006.01)
*F02B 3/02* (2006.01)
(52) U.S. Cl. .................. 123/299; 123/300
(58) Field of Classification Search .......... 123/299, 123/300, 301, 304, 305, 295, 430; 701/104
See application file for complete search history.

(56) References Cited

U.S. PATENT DOCUMENTS

| 6,912,991 B2* | 7/2005 | Herden | 123/299 |
| 8,196,560 B2* | 6/2012 | Fujikawa et al. | 123/305 |
| 2003/0066508 A1* | 4/2003 | Nakayama et al. | 123/295 |
| 2008/0295798 A1* | 12/2008 | Reitz et al. | 123/299 |

FOREIGN PATENT DOCUMENTS

JP    2007-177731 A    7/2007

* cited by examiner

*Primary Examiner* — Mahmoud Gimie
(74) *Attorney, Agent, or Firm* — Crowell & Moring LLP

(57) ABSTRACT

When a direct injection type internal combustion engine is in an operating state, a fuel is split and jetted into a cylinder of the internal combustion engine and split injections are performed in a manner to make a ratio of a piston travel and an injection pulse width of split injection constant in a cycle whereby a rich mixture is not locally generated and a mixture in a cylinder of the internal combustion engine is put in a condition near stoichiometry. Also, when the internal combustion engine is in cold condition, a fuel is split and jetted and split injections are performed so that the ratio of the piston travel and the injection pulse width of split injections monotonously increases in a cycle.

7 Claims, 23 Drawing Sheets

US 8,387,587 B2

CONTROL UNIT FOR DIRECT INJECTION ENGINE

BACKGROUND OF THE INVENTION

The present invention relates to a fuel injection equipment of a direct injection type internal combustion engine provided with an injector, which jets a fuel directly into a combustion chamber, and a control unit therefor.

Vehicles (automobiles) are presently demanded of reduction in emission such as CO, HC, NOx, etc. contained in exhaust gases of automobiles and reduction in fuel consumption from a standpoint of environmental preservation. With a view to reduction in them, direct injection type internal combustion engines have been developed. With direct injection type internal combustion engines, an injector jets a fuel directly into a combustion chamber of a cylinder whereby reduction in emission, reduction in fuel consumption, an improvement in engine output, etc. are accomplished.

There is particulate number of a particulate substance, so-called particulate matter (referred below to as PM) as emission. The particulate number indicates a total particulate number of PM particles exhausted when a vehicle is operated in a predetermined operation pattern. In recent years, needs for reduction in particulate number of particulate matter are increasingly demanded to vehicular engines, in particular, direct injection type internal combustion engines.

It is known to split and jet a fuel quantity, which is needed in a direct injection type internal combustion engine, plural times when the direct injection type internal combustion engine is operated, with a view to reduction in smoke, total hydro carbon, and the particulate number of particulate matter.

There have been proposed direct injection type internal combustion engines, for example, direct injection type internal combustion engines provided with injectors for direct injection of a fuel directly into cylinders, in which engines a fuel is jetted at least once in each of former, intermediate, and latter parts in intake stroke and respective fuel injection quantities are conformed to ratios of intake air flow rates per unit time in injection timings (JP-A-2007-177731).

SUMMARY OF THE INVENTION

The invention is directed to reduction in THC, CO, PM contained in exhaust gases exhausted from an engine. In order to solve such problem, the inventors of the present application have paid our attention to homogeneity of a mixture in a cylinder of a direct injection type internal combustion engine in timing of each injection in the case where split injection is performed. When an intake air quantity flowing into a cylinder and a fuel quantity in each injection are unbalanced, a rich mixture is generated locally in the cylinder and the mixture is impaired in homogeneity. Consequently, an increase in THC, CO, PM contained in emission is produced and a decrease in output and fuel consumption is resulted.

The invention has been thought of in view of such problem and has its object to provide a control unit for a direct injection type internal combustion engine, which control unit performs split injection to improve homogeneity of a mixture in a cylinder at each injection and suppress local generation of a rich mixture in the cylinder when the internal combustion engine is in an operating state, thereby reducing THC, CO, PM contained in emission and achieving an improvement in output and fuel consumption.

A method of controlling a direct injection type internal combustion engine, in which a fuel is jetted plural times in intake stroke according to the invention, the method comprising controlling a fuel injection quantity so that a ratio of a fuel injection quantity proportion and a piston travel proportion becomes constant in value, said fuel injection quantity proportion being a ratio of an integrated fuel quantity at the time of termination of an arbitrary fuel injection to a total fuel injection quantity in intake stroke, and said piston travel proportion being a ratio of a piston travel from a top dead center at the time of termination of the arbitrary fuel injection with respect to a distance, over which a piston travels from the top dead center to a bottom dead center during intake stroke.

According to the invention, local generation of a rich mixture in a cylinder is suppressed with the result that it is possible to reduce THC, CO, PM contained in emission and achieve an improvement in output and fuel consumption.

Other objects, features, and advantages of the present invention will become apparent from the following description of embodiments of the invention when taken in conjunction with the accompanying drawings.

DETAILED DESCRIPTION OF THE INVENTION

Figure 1:
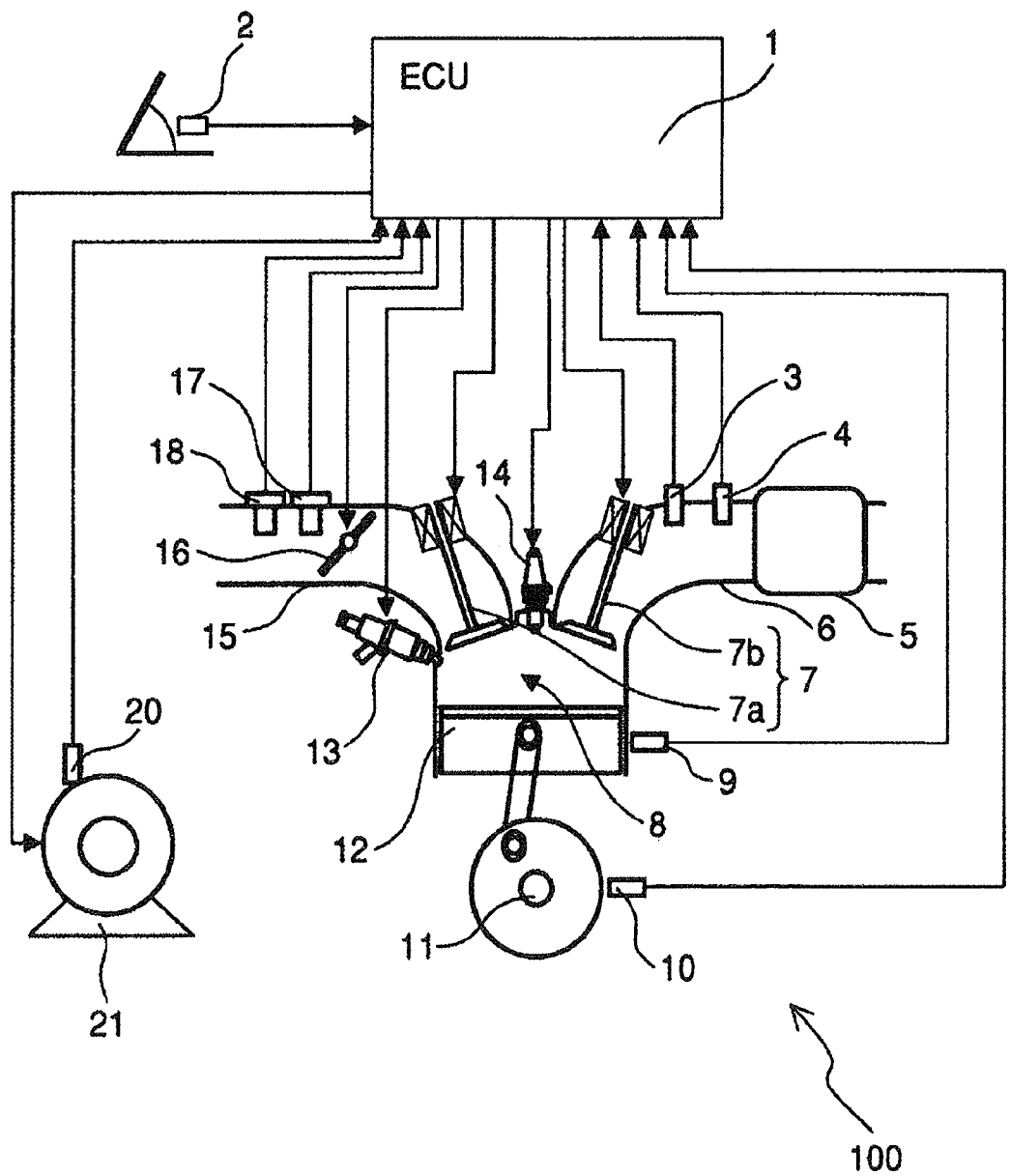
FIG. 1 is a view showing a configuration of a system, in which a control unit for a direct injection type internal combustion engine, according to a first embodiment of the invention, is applied to an automotive gasoline engine.

Embodiments of the invention are as follows.

A control method for a direct injection type internal combustion engine, in which a fuel is jetted plural times in intake stroke, comprises controlling a fuel injection timing in each split injection and each fuel injection quantity so that a fuel injection quantity proportion, which is a ratio of an integrated fuel quantity at the time of termination of an arbitrary fuel injection to a total fuel injection quantity in intake stroke, and a piston travel proportion, which is a ratio of a piston travel from a top dead center at the time of termination of the fuel injection to a distance, over which a piston travels to a bottom dead center from a top dead center, are made constant values.

The fuel injection quantity proportion is determined by a target air by fuel requested in an associated operating state and is a theoretical air by fuel (a stoichiometric air by fuel) in the embodiment. It is important to perform control so that a rich region, in which an air by fuel becomes rich, is not generated in a combustion chamber as far as possible by performing control so as not to make an air by fuel in the combustion chamber at the time of termination of each injection in split injection closer to a rich side than a target air by fuel. This is because such rich region is responsible for degradation in exhaust gases.

Also, since the fuel injection quantity is proportional to a fuel pulse width, the former may be replaced by the latter. Hereupon, "constant value" is a value correlated with an operating state of an internal combustion engine at that point of time and a target air by fuel requested by an outside (user), etc. Since a total fuel injection quantity can be calculated by summing up respective fuel injection quantities and fuel pulse widths in split injection and a quantity of an air flowing into a combustion chamber can be calculated from a piston travel, performing control so as to make a ratio of them a constant value is nothing but performing control so that a ratio of a fuel quantity and an air quantity, which vary every moment in a combustion chamber, that is, an air by fuel is made a constant value by split injection in intake stroke.

Also, in the case where the time of termination of last fuel injection in split injection does not agree with a bottom dead center of a piston, an interior of a combustion chamber inclines a little toward a rich side from a target air by fuel at the time of termination of last fuel injection and is then made by an intake air flowing into the combustion chamber to correspond to the target air by fuel. Control is not limited to one, by which the last fuel injection is surely terminated when a piston comes to a bottom dead center in intake stroke, but an air by fuel in a combustion chamber shifts toward a rich side from a target air by fuel in the course from termination of injection to termination of intake stroke in the case where the last fuel injection is terminated on a spark-advance side from the bottom dead center in intake stroke. Even in this case, it is important to perform control so that the target air by fuel is materialized in the combustion chamber at the time of termination of injection, that is, a ratio of a fuel injection proportion, or a fuel injection pulse width proportion and a piston travel is made a constant value.

A ratio of a piston travel and each injection pulse width in an internal combustion engine is set every operating condition and a fuel is split and jetted according to the ratio of a piston travel and each injection pulse width. It is possible to appropriately perform a fuel injection control conformed to an operating condition.

Preferably, the ratio of a piston travel and each injection pulse width is calculated from a target air by fuel and intake pressure, or from a target air by fuel and an intake air quantity.

Preferably, a fuel is split and jetted at the time of intake valve spark-advance so that the ratio of a piston travel and each injection pulse width is made at least a value at the time of intake valve spark-lag and made constant in a cycle.

Preferably, when an internal combustion engine is in cold condition, a fuel is split and jetted so that the ratio of a piston travel and each injection pulse width monotonously increases in a cycle.

Since an improvement in exhaust gases is most demanded in a scene at the time of start in cold condition, a great effect can be produced by carrying out the embodiment of the invention at the time of start in cold condition.

Preferably, a fuel is split and jetted at the time of intake valve spark-lag so that the ratio of a piston travel and each injection pulse width monotonously increases in a cycle.

Referring to FIGS. 1 to 12, a control unit for a direct injection type internal combustion engine, according to a first embodiment of the invention, will be described with respect to construction and action.

First, referring to FIG. 1, an explanation will be given to a construction of a system, in which a control unit for a direct injection type internal combustion engine, according to the embodiment, is applied to an automotive gasoline engine.

FIG. 1 is a view showing a construction of a system, in which the control unit for a direct injection type internal combustion engine, according to the first embodiment of the invention, is applied to an automotive gasoline engine.

An engine 100 is an automotive gasoline engine, in which spark ignition type burning is carried out. Each intake pipe 15 is provided with, at appropriate positions thereof, an airflow sensor 18, which measures an intake air quantity, an electronic controlled throttle 16, which regulates an intake pipe pressure, and an intake air temperature sensor 17, which is a kind of intake air temperature detectors to measure temperature of an intake air. Also, each cylinder of the engine 100 is provided with a fuel injection equipment (referred below to as injector) 13, which jets a fuel into a combustion chamber 8 of the cylinder, and an ignition plug 14, which supplies an ignition energy, and a cooling water temperature sensor 9, which measures temperature of a cooling water for the engine, is provided in an appropriate position on the engine 100. Also, variable valves 7 comprising an intake valve variable device 7a, which regulates intake gases flowing into a cylinder, and an exhaust valve variable device 7b, which regulates exhaust gases flowing out of the cylinder are provided at appropriate positions of the engine 100. Intake gases and EGR are regulated in quantity by regulating the variable valves 7.

Further, the engine 100 comprises a fuel pump 21, which is a kind of pressure regulators to supply a fuel to the injector 13 and provided in an appropriate position on the engine 100. Also, the fuel pump 21 is provided with a fuel pressure sensor 20, which is a kind of air by fuel detectors to measure fuel pressure.

Further, a three way catalyst 5 for purification of exhaust gases, an air by fuel sensor 4, which is a kind of air by fuel detectors to detect an air by fuel of exhaust gases on an upstream side of the three way catalyst 5, and an exhaust gas temperature sensor 3, which is a kind of exhaust gas temperature detectors to measure temperature of exhaust gases on the upstream side of the three way catalyst 5 are provided at appropriate positions on each exhaust pipe 6. Also, a crankshaft 11 is provided with a crank angle sensor 10 for calculation of a rotating angle and a travel of a piston 12.

Signals obtained from the airflow sensor 18, the intake air temperature sensor 17, the cooling water temperature sensor 9, the fuel pressure sensor 20, the air by fuel sensor 4, and the exhaust gas temperature sensor 3 are fed to an engine control unit (referred hereinafter to as ECU) 1. Also, a signal obtained from an accelerator opening degree sensor 2 is fed to the ECU 1. The accelerator opening degree sensor 2 detects a stepping quantity of an accelerator pedal, that is, an accelerator opening degree. The ECU 1 calculates a request torque on the basis of an output signal of the accelerator opening degree sensor 2. That is, the accelerator opening degree sensor 2 is used as a request torque sensor to detect a request torque for the engine 100. Also, the ECU 1 calculates a rotating speed of the engine 100 and a travel of the piston 12 on the basis of an output signal of the crank angle sensor 10. The ECU 1 calculates main operating quantities of the engine 100 such as an air flow rate, a fuel injection quantity, ignition timing, etc. in an optimum manner.

The fuel injection quantity calculated by the ECU 1 is converted into a valve opening pulse signal to be fed to the injector 13. Also, an ignition plug drive signal is fed to the ignition plug 14 so as to achieve ignition in the ignition timing calculated by the ECU 1. Also, the throttle opening degree calculated by the ECU 1 is fed as a throttle drive signal to the electronic controlled throttle 16. Also, the operating quantities of the variable valves are fed as a variable valve drive signal to the variable valves 7. Also, the operating quantity of the fuel pump calculated by the ECU 1 is fed as a fuel pump drive signal to the fuel pump 21.

A fuel is jetted against an air flowing into the combustion chamber 8 through an intake valve from the intake pipe 15 to form a mixture. Spark generated from the ignition plug 14 in a predetermined ignition timing explodes the mixture and combustion pressure pushes down the piston 12 to make a driving force of the engine 100. Further, exhaust gases after the explosion is fed through the exhaust pipe 6 into the three way catalyst 5 and exhaust constituents are purified in the three way catalyst 5 to be exhausted to outside.

Subsequently, referring to FIG. 2, an explanation will be given to the construction of the control unit for a direct injection type internal combustion engine, according to the embodiment.

Figure 2:
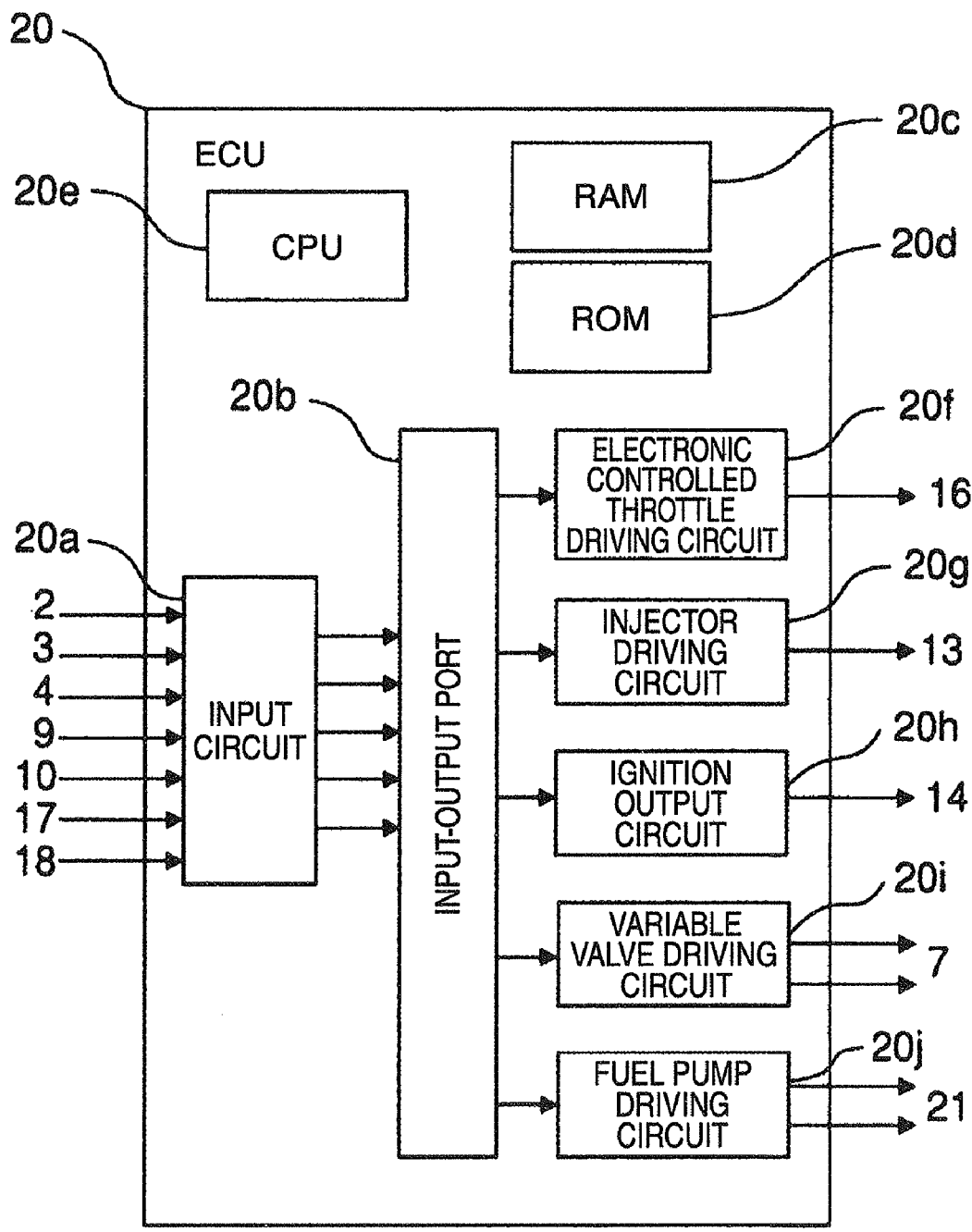
FIG. 2 is a system block diagram showing the construction of the control unit for a direct injection type internal combustion engine, according to the first embodiment of the invention.

FIG. 2 is a system block diagram showing the construction of the control unit for a direct injection type internal combustion engine, according to the first embodiment of the invention.

Output signals of the accelerator opening degree sensor 2, the exhaust gas temperature sensor 3, the air by fuel sensor 4, the cooling water temperature sensor 9, the crank angle sensor 10, the intake air temperature sensor 17, the airflow sensor 18, and the fuel pressure sensor 20 are input into an input circuit 20*a* of the ECU 1. However, input signals are not limited to these signals. The output signals of the respective sensors as input are fed to an input port in an input-output port 20*b*. Values fed to the input-output port 20*b* are stored in a RAM 20*c* to be subjected to arithmetic processing in CPU 20*e*. A control program describing the contents of the arithmetic processing is beforehand written in a ROM 20*d*.

Values indicative of those operating quantities of the respective actuators, which are calculated according to the control program, are stored in the RAM 20*c*, then the values are fed to an output port of the input-output port 20*b*, and the values are fed to the respective actuators through respective driving circuits. In the embodiment, the driving circuits include an electronic controlled throttle driving circuit 20*f* an injector driving circuit 20*g*, an ignition output circuit 20*h*, a variable valve driving circuit 20*i*, and a fuel pump driving circuit 20*j*. The circuits respectively control the electronic controlled throttle 16, the injector 13, the ignition plug 14, the variable valves 7, and the fuel pump 21. In the embodiment, while the driving circuits are provided in the ECU 1, this is not limitative but any one of the driving circuits may be provided in the ECU 1.

Subsequently, referring to FIGS. 3 and 4, an explanation will be given to the characteristics of a control program in the control unit for a direct injection type internal combustion engine, according to the embodiment.

Figure 3:
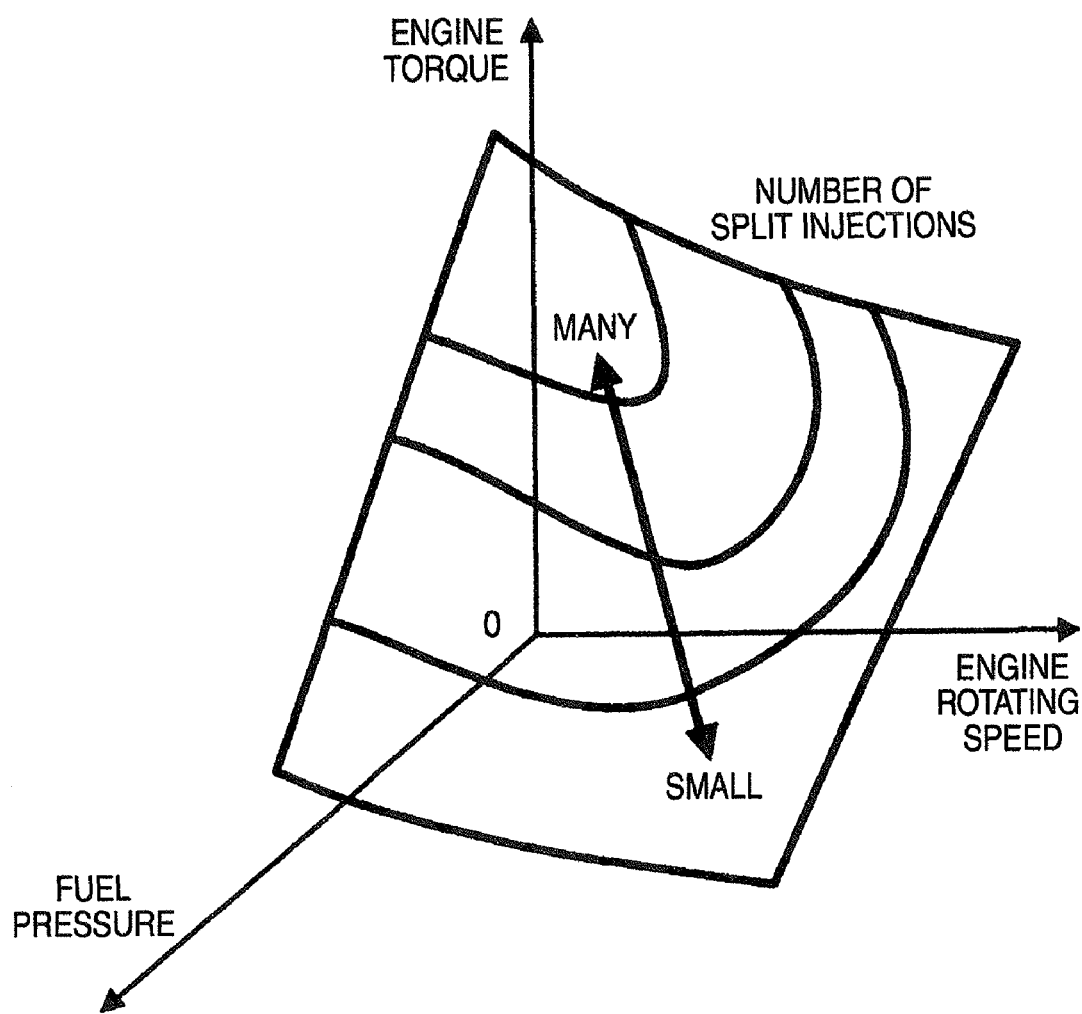
FIG. 3 is a view illustrating a control map for determination of number of fuel split injections in the characteristics of a control program in the control unit for a direct injection type internal combustion engine, according to the first embodiment of the invention.

FIG. 3 is a view illustrating a control map for determination of number of fuel split injections in the characteristics of the control program in the control unit for a direct injection type internal combustion engine, according to the first embodiment of the invention. The embodiment comprises the control map, in which a fuel is split and jetted in plural times from the injector 13, and the number of fuel split injections made optimum for respective operating conditions can be set from a request torque calculated from an output signal of the accelerator opening degree sensor 2, a rotating speed of the engine 100 calculated from an output signal of the crank angle sensor 10, and fuel pressure calculated from an output signal of the fuel pressure sensor 20.

Figure 4:
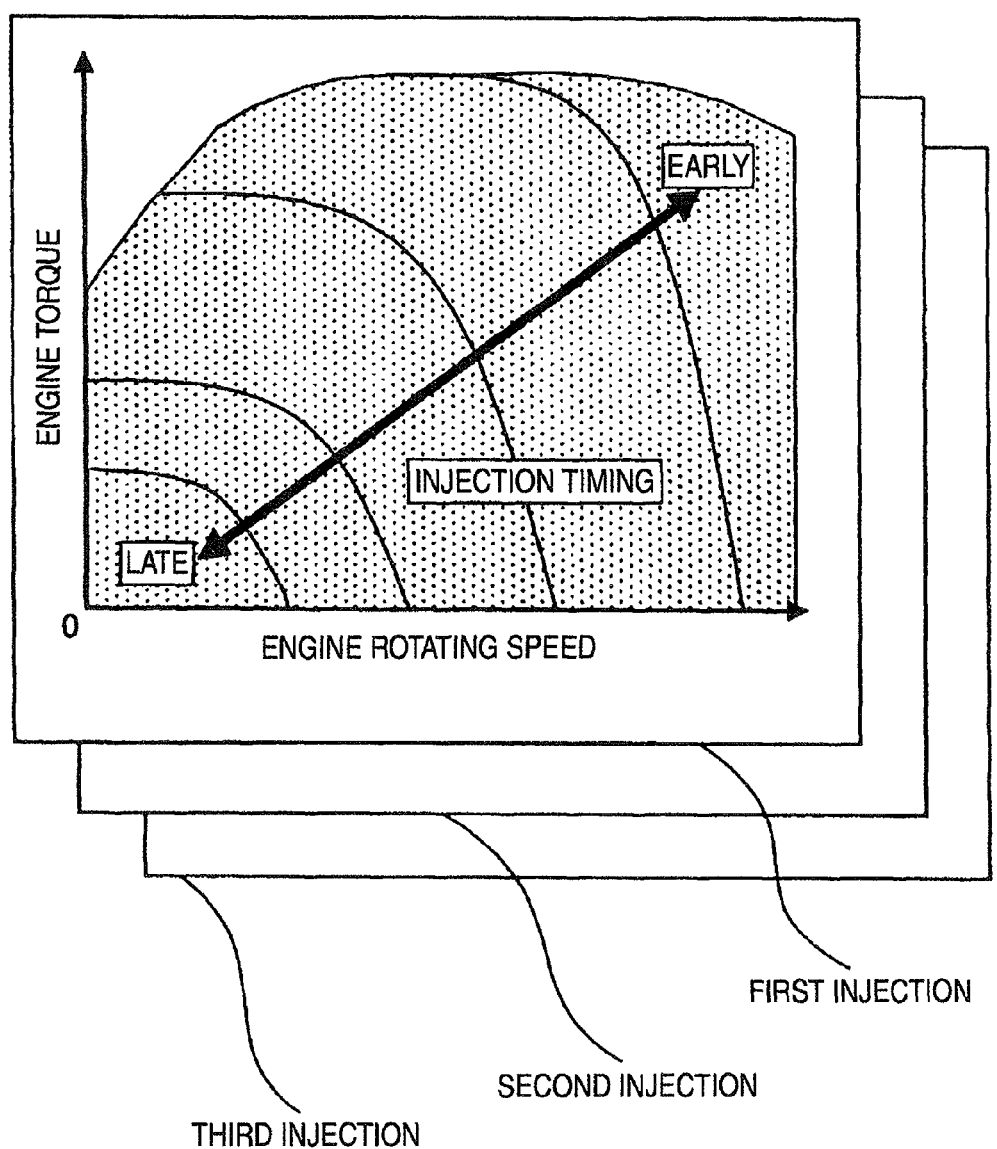
FIG. 4 is a view illustrating a control map for determination of timings of respective injections of split injection in the characteristics of the control program in the control unit for a direct injection type internal combustion engine, according to the first embodiment of the invention.

FIG. 4 is a view illustrating a control map for determination of timings of respective injections of split injection in the characteristics of the control program in the control unit for a direct injection type internal combustion engine, according to the first embodiment of the invention. The embodiment comprises the control map, in which a fuel is split and jetted in plural times from the injector 13, and after the number of fuel split injections made optimum for respective operating conditions is set from a request torque calculated from an output signal of the accelerator opening degree sensor 2, a rotating speed of the engine 100 calculated from an output signal of the crank angle sensor 10, and fuel pressure calculated from an output signal of the fuel pressure sensor 20, respective injection timings can be set according to the control map for split injection shown in FIG. 4. Also, respective injection timings are set intermittently without overlapping one another. While the embodiment comprises that control map every injection, calculated from a request torque and an engine rotating speed, this is not limitative but the embodiment may comprise a control map calculated from either of the request torque and the engine rotating speed. Further, the number of control maps every injection shown in FIG. 4 is conformed to the number of split injections and so is not limited to 3.

Subsequently, referring to FIGS. 5, 6, and 7, an explanation will be given to the characteristics of the variable valves in the control unit for a direct injection type internal combustion engine, according to the embodiment.

Figure 5:
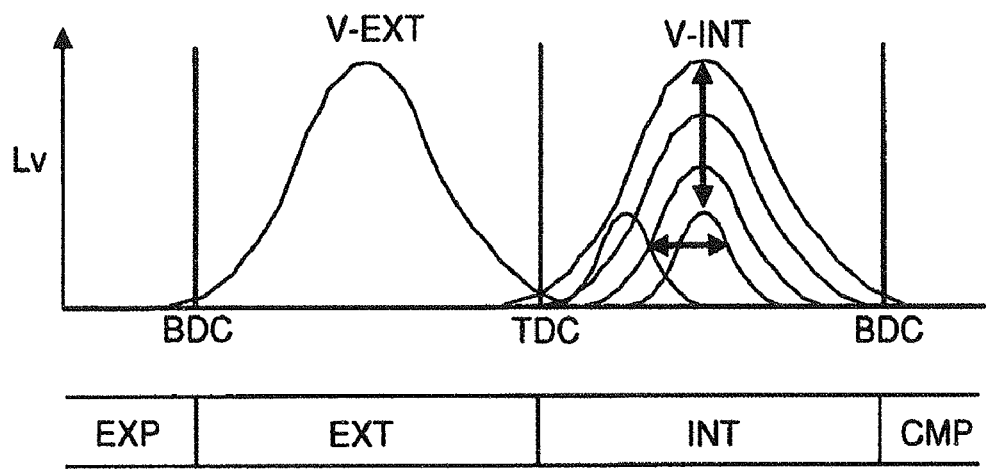
FIG. 5 is a view illustrating the characteristics of a variable valve mechanism in the control unit for a direct injection type internal combustion engine, according to the first embodiment of the invention.

FIG. 5 is a view illustrating the characteristics of a variable valve mechanism in the control unit for a direct injection type internal combustion engine, according to the first embodiment of the invention. In the embodiment, the intake valve and the exhaust valve comprise mechanisms for continuous variation of phase and lift and it is possible to independently control an intake valve opening timing and an intake valve closing timing. In the embodiment, while the intake valve and the exhaust valve comprise mechanisms for continuous variation of phase and lift, this is not limitative but either of the intake valve and the exhaust valve may comprise such mechanism. Further, continuous variation of either of phase and lift will do.

Figure 6:
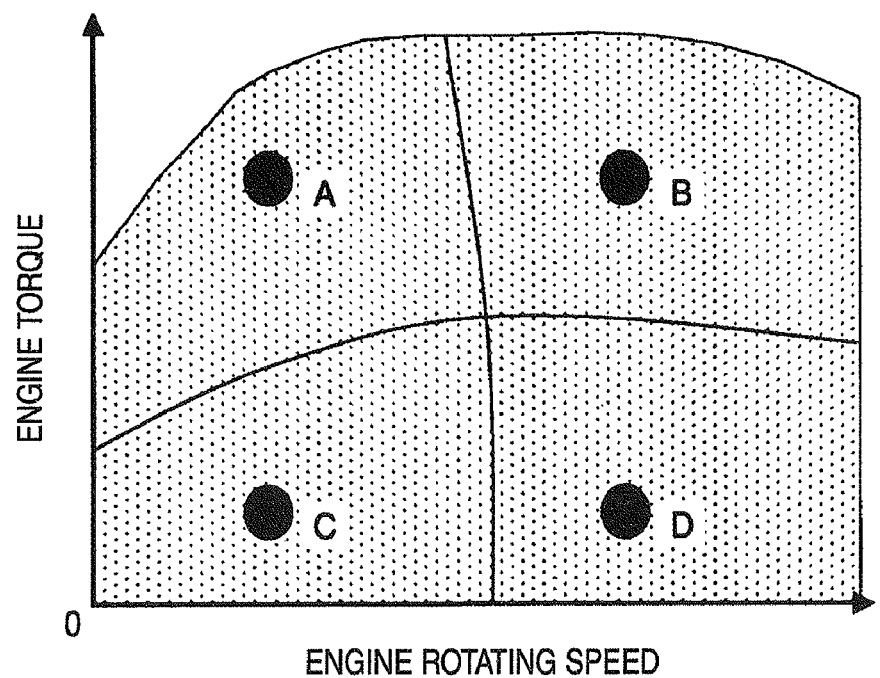
FIG. 6 is a view illustrating operating ranges in the control unit for a direct injection type internal combustion engine, according to the first embodiment of the invention.

FIG. 6 is a view illustrating operating ranges in the control unit for a direct injection type internal combustion engine, according to the first embodiment of the invention. In the embodiment, a low-load low-rotation range C, a low-load high-rotation range D, a high-load low-rotation range A, and a high-load high-rotation range B are beforehand defined on a map of engine torque and engine rotating speed to be held in the ROM 20*d* shown in FIG. 2. The ECU 1 determines, which of the operating ranges corresponds to a present engine operating state, on the basis of a request torque calculated from an output signal of the accelerator opening degree sensor 2 and a rotating speed of the engine 100 calculated from an output signal of the crank angle sensor 10.

Figure 7:
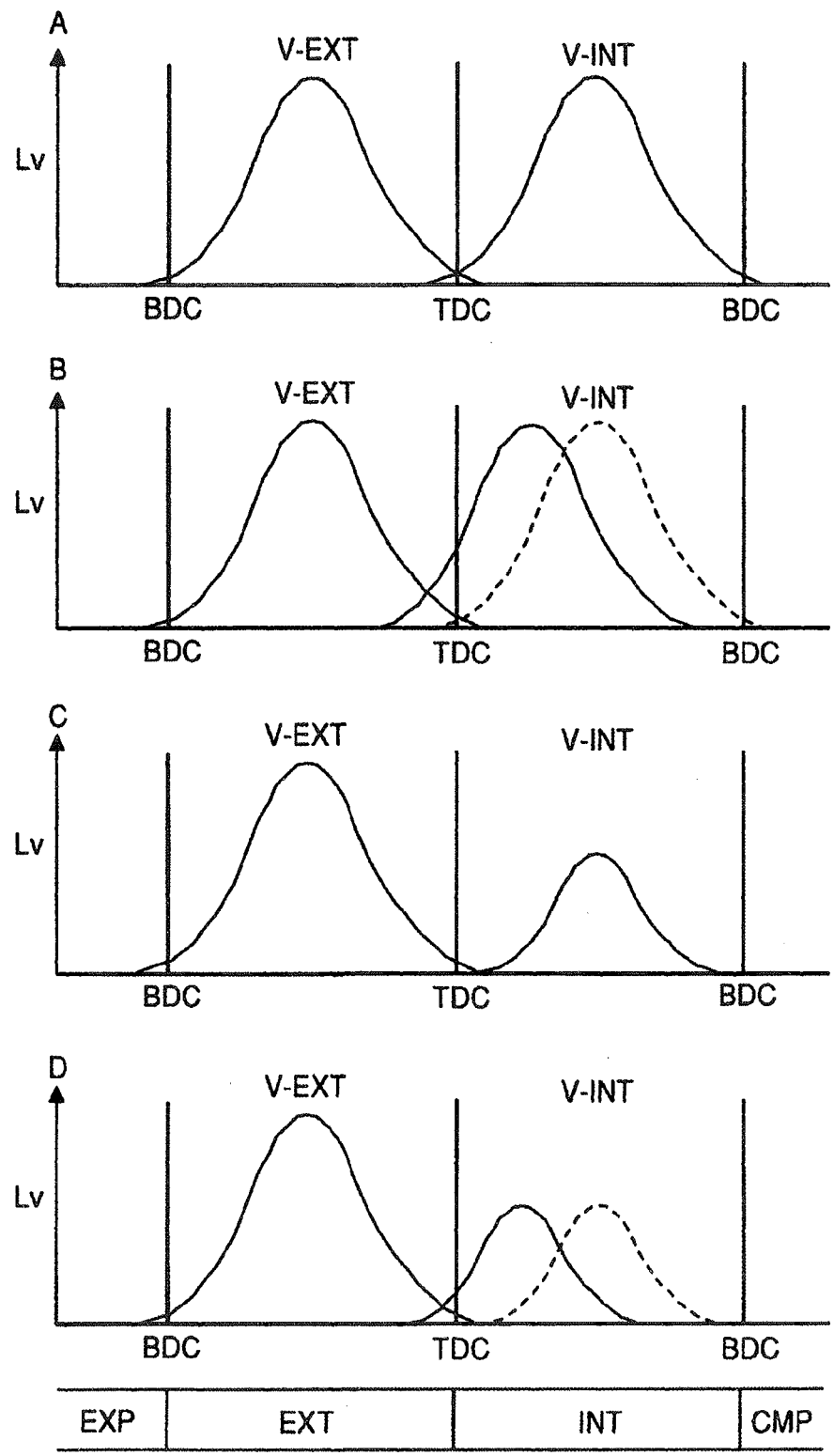
FIG. 7 is a view showing a representative example of setting of an intake valve and an exhaust valve in the control unit for a direct injection type internal combustion engine, according to the first embodiment of the invention.

FIG. 7 is a view showing a representative example of setting of the intake valve and the exhaust valve in the control unit for a direct injection type internal combustion engine, according to the first embodiment of the invention. The operating ranges A, B, C, and D in FIG. 7 respectively correspond to operating ranges A, B, C, and D in FIG. 6. In FIG. 7, axes of abscissa indicate crank angles and axes of ordinate indicate valve lifts Lv. In addition, solid lines V-EXT indicate lifts of the exhaust valve and solid lines V-INT indicate lifts of the intake valve.

In the high-load low-rotation range A, in which a large quantity of an air is needed, an intake valve closing timing is set around the bottom dead center. In the high-load high-rotation range B, an intake valve opening timing and an intake valve closing timing are advanced. In the low-load low-rotation range C, an intake valve lift Lv is set small as compared with that in the high-load low-rotation range A. In the low-load high-rotation range D, an intake valve opening timing and an intake valve closing timing are advanced.

Subsequently, referring to FIGS. 8, 9, 10, and 11, an explanation will be given to the characteristics of fuel split injection in the control unit for a direct injection type internal combustion engine, according to the embodiment.

Figure 8:
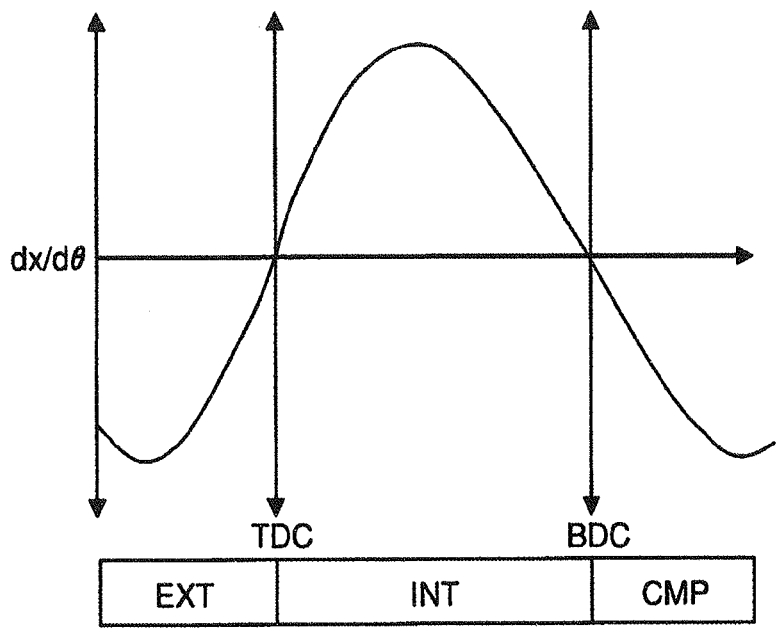
FIG. 8 is a view illustrating a piston traveling speed $dx/d\theta$ per crank angle of a direct injection type internal combustion engine in the control unit for a direct injection type internal combustion engine, according to the first embodiment of the invention.

FIG. 8 is a view illustrating a piston traveling speed dx/dθ per crank angle of a direct injection type internal combustion engine in the control unit for a direct injection type internal combustion engine, according to the first embodiment of the invention.

When the internal combustion engine is in intake stroke, a piston traveling speed dx/dθ becomes positive. The piston traveling speed dx/dθ is determined from the geometrical construction of the internal combustion engine. A value obtained by integrating a piston traveling speed dx/dθ on an arbitrary crank angle makes a piston travel x. The piston traveling speed dx/dθ is held in the ROM $20d$ shown in FIG. 2.

Figure 9:
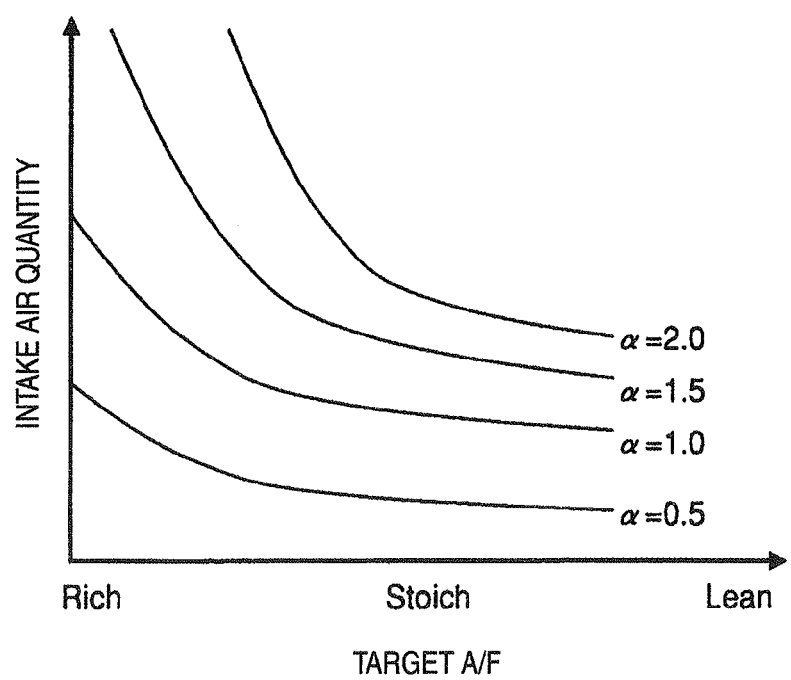
FIG. 9 is a view illustrating the characteristics of a ratio $\alpha$ of a piston travel from a point of time, at which a piston of an internal combustion engine is present at an intake top dead center, to the time of termination of first injection, and after the first injection, a piston travel $x(i)$ (i denotes an order in split injections) from the time of termination of just preceding injection to the time of termination of associated injection, and an injection pulse width $w(i)$ corresponding to the piston travel in the control unit for a direct injection type internal combustion engine, according to the first embodiment of the invention.

FIG. 9 is a view illustrating the characteristics of a ratio α of a piston travel from a point of time, at which a piston of the internal combustion engine is present at an intake top dead center, to the time of termination of first injection, and after the first injection, a piston travel x(i) (i denotes an order in split injections) from the time of termination of just preceding injection to the time of termination of associated injection, and an injection pulse width w(i) corresponding to the piston travel in the control unit for a direct injection type internal combustion engine, according to the first embodiment of the invention. In FIG. 9, an axis of abscissa indicates a target air by fuel and an axis of ordinate indicates an intake air quantity of the internal combustion engine. In addition, areas separated by solid lines indicate ranges of a ratio α of a piston travel from a point of time, at which a piston of the internal combustion engine is present at an intake top dead center, to the time of termination of first injection, and after the first injection, a piston travel x(i) (i denotes an order in split injections) from the time of termination of just preceding injection to the time of termination of associated injection, and an injection pulse width w(i) corresponding to the piston travel. In the embodiment, the ratio α is beforehand defined on the map of a target air by fuel and an intake air quantity to be held in the ROM $20d$ shown in FIG. 2.

Figure 10:
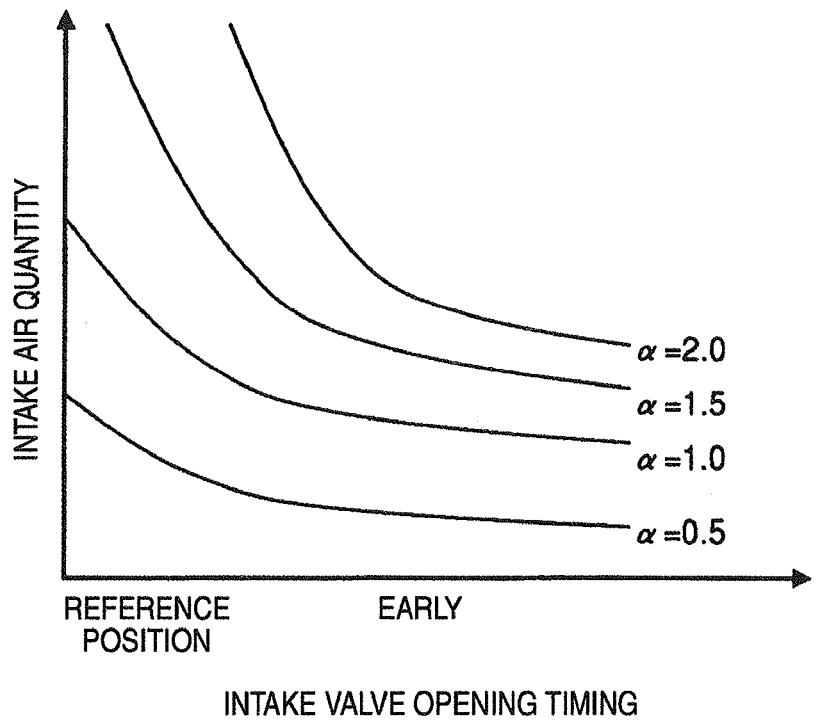
FIG. 10 is a view illustrating the characteristics of a ratio α of a piston travel from a point of time, at which a piston of an internal combustion engine is present at an intake top dead center, to the time of termination of first injection, and after the first injection, a piston travel x(i) (i denotes an order in split injections) from the time of termination of just preceding injection to the time of termination of associated injection, and an injection pulse width w(i) corresponding to the piston travel in the control unit for a direct injection type internal combustion engine, according to the first embodiment of the invention.

FIG. 10 is a view illustrating the characteristics of the ratio α in the control unit for a direct injection type internal combustion engine, according to the first embodiment of the invention. In FIG. 10, an axis of abscissa indicates an intake valve opening timing and an axis of ordinate indicates an intake air quantity of the internal combustion engine. In addition, areas separated by solid lines indicate ranges of the ratio α. In the embodiment, the ratio α is beforehand defined on the map of an intake valve opening timing and an intake air quantity (FIG. 10) to be held in the ROM $20d$ shown in FIG. 2.

Figure 11:
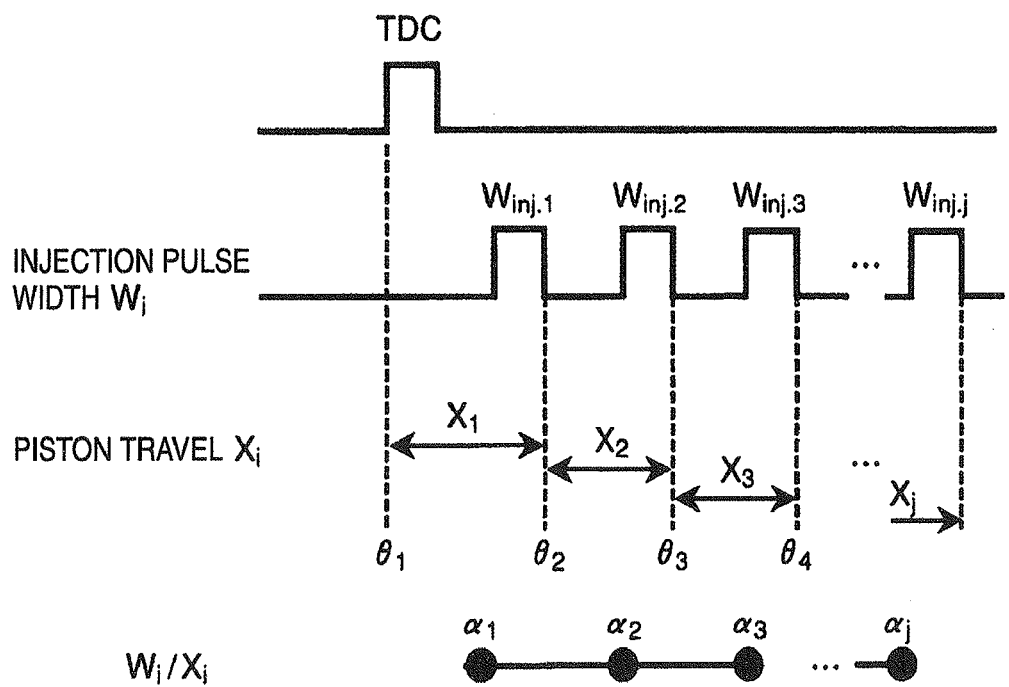
FIG. 11 is a view illustrating a split injection control in the control unit for a direct injection type internal combustion engine, according to the first embodiment of the invention.

FIG. 11 is a view illustrating a split injection control in the control unit for a direct injection type internal combustion engine, according to the first embodiment of the invention.

A piston travel from a point of time, at which a piston of the internal combustion engine is present at an intake top dead center, to the time of termination of first injection, and after the first injection, a piston travel x(i) (i denotes an order in split injections) from the time of termination of just preceding injection to the time of termination of associated injection are calculated. Subsequently, the respective injection pulse widths w(i) are set so that the α becomes constant in a cycle.

Subsequently, referring to FIG. 12, an explanation will be given to the contents of control of split injection in the control unit for a direct injection type internal combustion engine, according to the embodiment.

Figure 12:
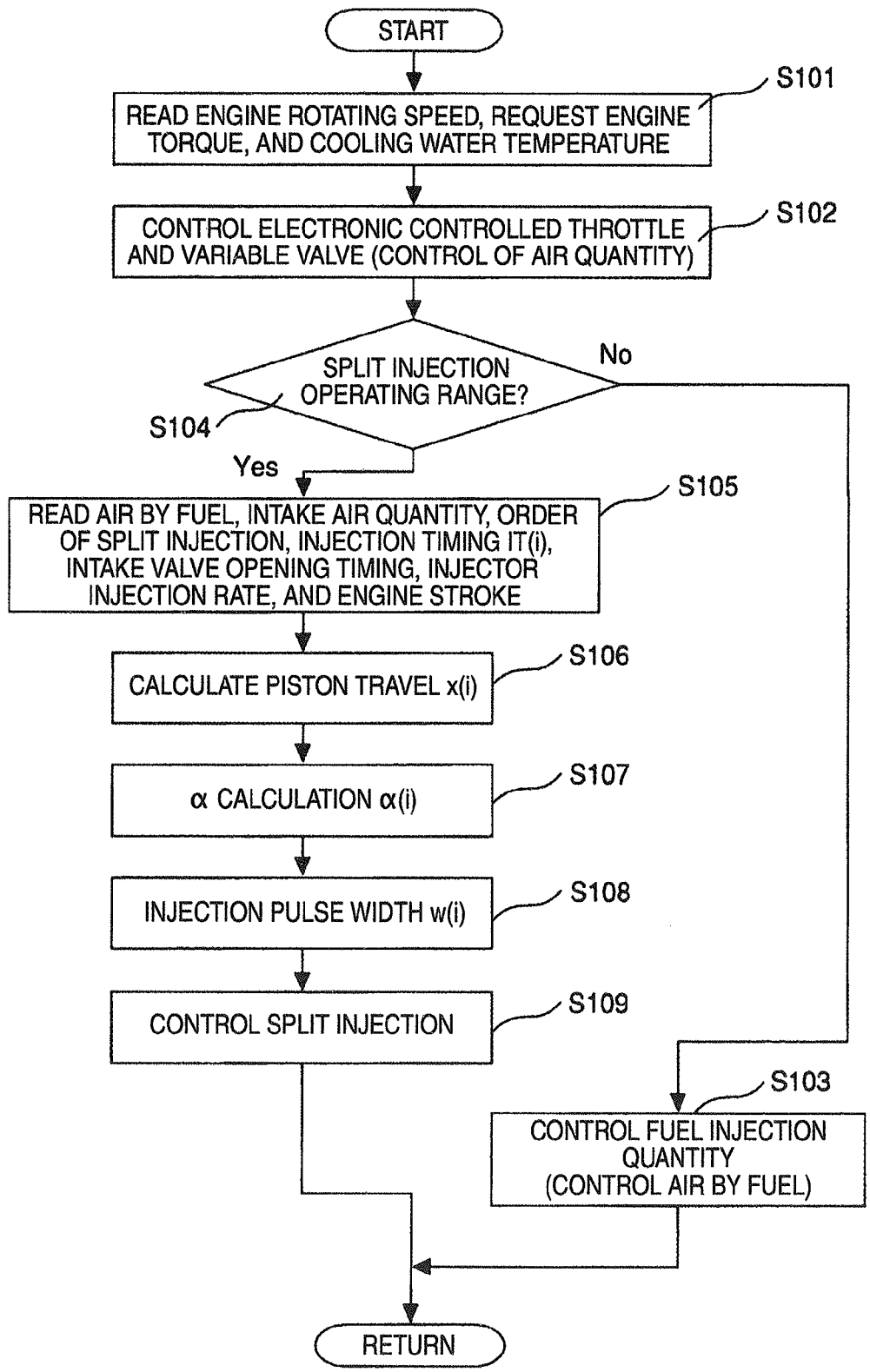
FIG. 12 is a flowchart showing the contents of control of split injection in the control unit for a direct injection type internal combustion engine, according to the first embodiment of the invention.

FIG. 12 is a flowchart showing the contents of control of fuel injection in the control unit for a direct injection type internal combustion engine, according to the first embodiment of the invention.

The contents of control shown in FIG. 12 are repeatedly carried out by the ECU 1 with a predetermined period.

The ECU 1 reads information (engine rotating speed, request engine torque, cooling water temperature, etc.) with respect to a present operating range in STEP S101. As described, the request engine torque is calculated on the basis of an output signal of the accelerator opening degree sensor 2.

Subsequently, the electronic controlled throttle and the variable valves are controlled on the basis of a present operating range in a manner to realize an appropriate intake air quantity.

Subsequently, the ECU 1 determines whether a present operating range is a split injection operating range, from the map beforehand memorized, etc. in STEP S104. In case of a split injection operating range, a target air by fuel, an intake air quantity, the order of split injection, an injection timing, an intake valve opening timing, an injector injection rate, and an engine stroke at present are read in STEP S105. Hereupon, for the injector injection rate and the engine stroke, those beforehand held in the ROM $20d$ are referred to.

Subsequently, the ECU 1 calculates a piston travel in STEP S106. Specifically, a piston traveling speed beforehand stored is first referred to from respective injection timings thus read (FIG. 8) to calculate a piston travel from a point of time, at which a piston of the internal combustion engine is present at an intake top dead center, to the time of termination of first injection, and after the first injection, a piston travel x(i) (i denotes an order in split injections) from the time of termination of just preceding injection to the time of termination of associated injection.

Subsequently, the ECU 1 calculates the ratio α in STEP S107. Specifically, the ration α is calculated referring to the characteristics (FIGS. 9 and 10) of the ratio α beforehand stored from the target air by fuel, the intake air quantity, the order of split injection, the injection timing, the intake valve opening timing, the injector injection rate, and the engine stroke at present, which have been read.

While an example, in which the ratio α is calculated from the target air by fuel and the intake air quantity detected directly by the airflow sensor, is shown, an intake air quantity calculated from an intake air pressure detected by an intake pressure sensor will do alternatively.

Subsequently, the ECU 1 calculates respective injection pulse widths in STEP S108. Specifically, respective injection pulse widths w(i) are calculated from the ratio α. Specifically, respective injection pulse widths w(i) are calculated by the following formula 1.

In case of using an airflow sensor:

$$w_i = \left[ \frac{1}{A/F_t} \cdot \frac{1}{R_{inj}} \cdot x_i \cdot \frac{m_{a,all}}{St} \cdot \alpha_i \right]$$

In case of using an intake air pressure sensor:

$$wi = \left[\frac{1}{A/F_t} \cdot \frac{1}{R_{inj}} \cdot x_i \cdot \frac{pA}{RT} \cdot \alpha_i\right]$$

A/F$_t$: target A/F
A: piston cross sectional area
R$_{inj}$: injection rate
p: intake air pressure
R: gas constant
T: temperature
St: stroke
m$_{a,\ all}$: intake air quantity Subsequently, the ECU 1 controls split injection on the basis of respective injection pulse widths w(i), which are calculated in STEP S108, in STEP S109.

In contrast, in the case where it is determined in STEP S104 that an associated range is not a split injection range, a fuel injection quantity is calculated in STEP S103 so as to provide for a desired air by fuel (mainly, stoichiometric proportion), on the basis of which fuel injection quantity a first injection is processed and control is terminated.

Subsequently, referring to FIGS. 13, 14, and 15, an explanation will be given to details of the contents of split injection control in the control unit for a direct injection type internal combustion engine, according to the embodiment.

Figure 13:
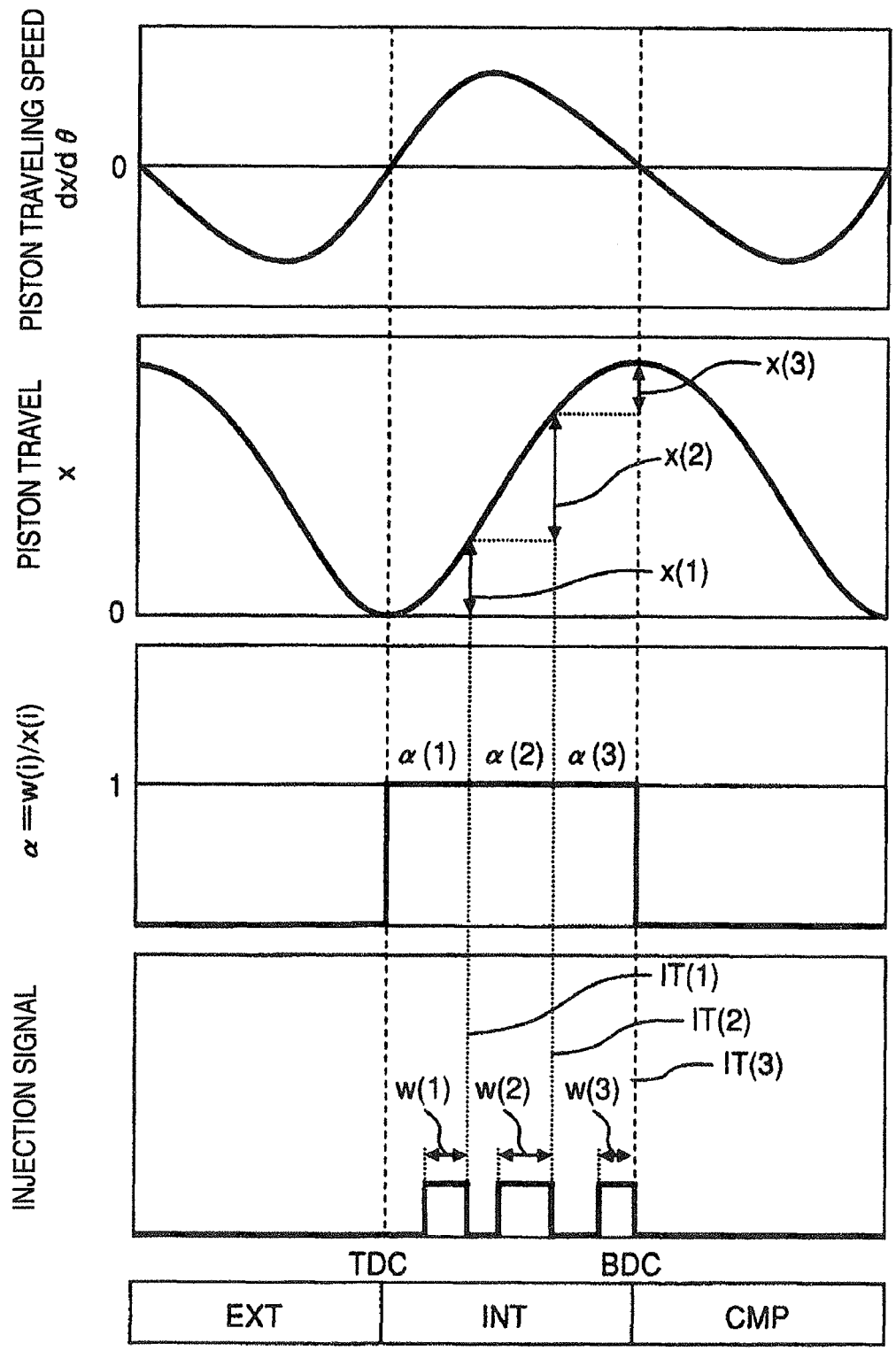
FIG. 13 is a view showing the relationship among the piston traveling speed dx/dθ, the piston travel x, the ratio α, and the injection signal, which drives an injector, in the case where the control unit for a direct injection type internal combustion engine, according to the first embodiment of the invention, performs three injections.

FIG. 13 shows the relationship among the piston traveling speed dx/dθ, the piston travel x, the ratio α, and an injection signal, which drives an injector, in the case where the control unit for a direct injection type internal combustion engine, according to the first embodiment of the invention, performs three injections. A piston travel x calculated from a piston traveling speed dx/dθ is separated by timings of respective injections in split injection beforehand stored, and a piston travel from a point of time, at which a piston of the internal combustion engine is present at an intake top dead center, to the time of termination of first injection, and after the first injection, a piston travel x(i) (i denotes an order in split injections) from the time of termination of just preceding injection to the time of termination of associated injection are calculated. That is, the control map (FIG. 3), in which a fuel is split and jetted plural times from the injector, is referred to, and the number of fuel split injections made optimum for respective operating conditions is set from a request torque calculated from an output signal of the accelerator opening degree sensor, a rotating speed of the engine calculated from an output signal of the crank angle sensor, and fuel pressure calculated from an output signal of the fuel pressure sensor, and thereafter respective injection timings are set and a piston travel x(i) is calculated on the basis of the respective injection timings. Specifically, the calculation is made according to the following formula 2.

$$x_i = \int_{\theta_i}^{\theta_{i+1}} \frac{dx}{d\theta} d\theta = \int_{\theta_i}^{\theta_{i+1}} r\left[\sin\theta + \frac{r}{2l}\sin2\theta\right]\frac{d\Theta}{d\theta} d\theta$$

r: crank radius [m]
l: connecting rod length [m]
Θ: crank angle [rad.]
θ: crank angle [deg. ATDC CA]

Subsequently, referring to the ratio α (FIG. 9) beforehand defined on the map of a target air by fuel and an intake air quantity, respective injection pulse widths w(i) of split injection are calculated with the ratio α(i) constant in respective injections in a cycle and injection signals are output on the basis of the injection pulse widths.

Figure 14:
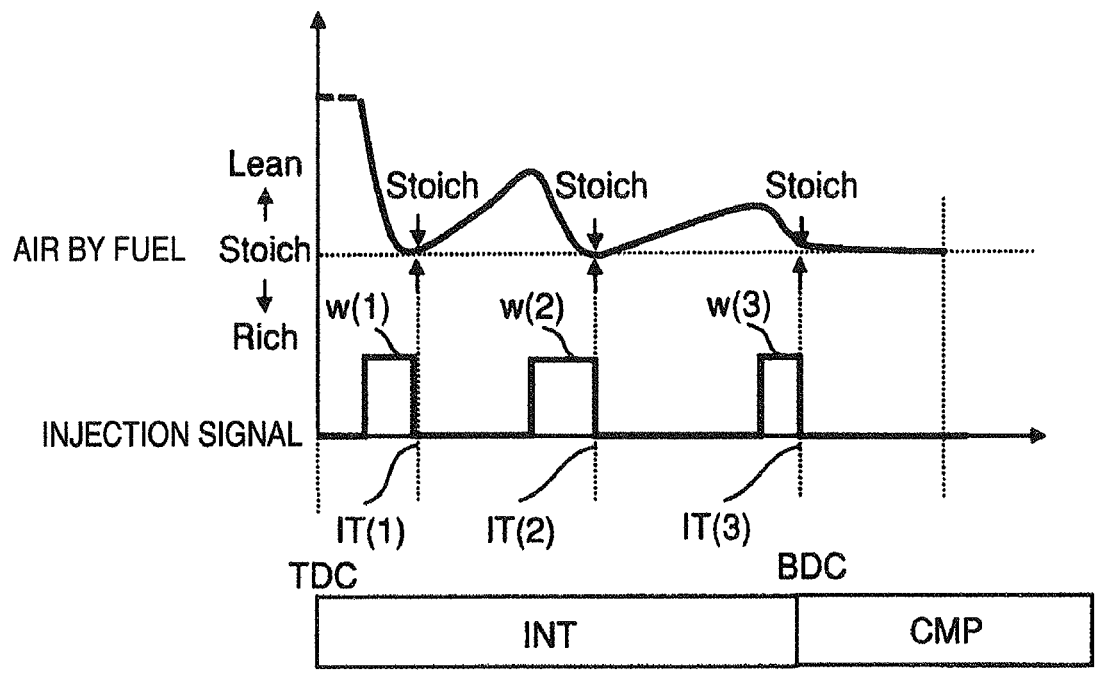
FIG. 14 is a view showing transition of an air by fuel of a mixture in a cylinder in intake stroke in the case where the control unit for a direct injection type internal combustion engine, according to the first embodiment of the invention, performs a split injection control with the ratio α(i) constant in a cycle.

FIG. 14 shows transition of an air by fuel of a mixture in a cylinder in intake stroke in the case where the control unit for a direct injection type internal combustion engine, according to the first embodiment of the invention, performs a split injection control with the ratio α(i) constant in a cycle.

In the case where split injection control is performed with the ratio α(i) constant in a cycle, an air by fuel of a mixture in a cylinder becomes a target air by fuel (mainly, stoichiometric proportion) in timings of termination of respective injections.

Since split injection control is performed with the ratio α(i) constant in a cycle for the reason whereby a fuel injection quantity conformed to an air quantity as sucked is supplied into a cylinder, it is possible to generate a mixture of a target air by fuel without local generation of a rich mixture in a cylinder.

Here, an intake air quantity calculated from an output signal of the airflow sensor is applied in calculation of the ratio α(i) but an intake air quantity calculated from the intake air pressure sensor and the intake air temperature sensor may be applied.

Subsequently, referring to FIGS. 15, 16, 17, and 18, an explanation will be given to a construction and action of a control unit for a direct injection type internal combustion engine, according to a second embodiment of the invention.

Figure 15:
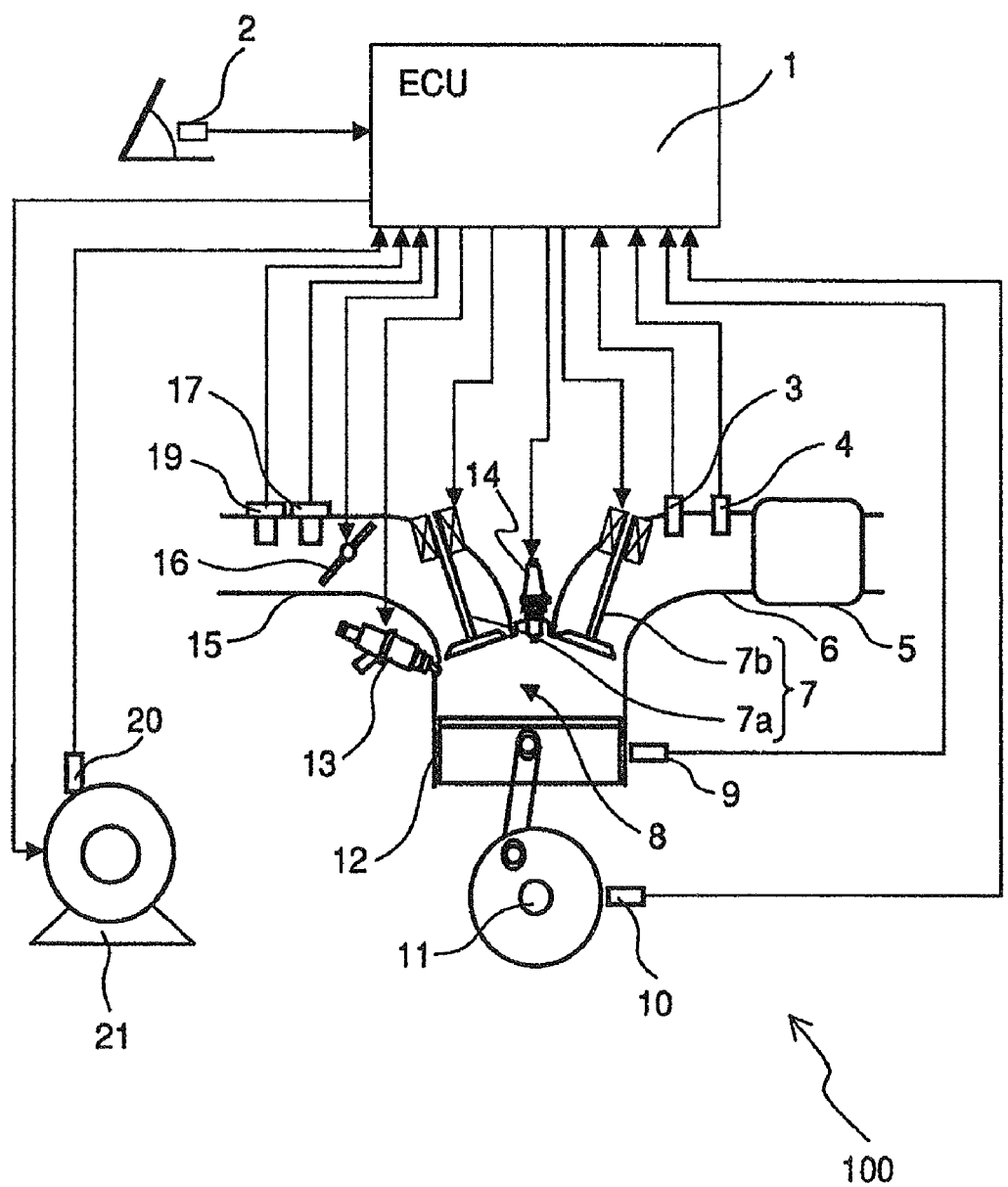
FIG. 15 is a view showing a construction of a system, in which a control unit for a direct injection type internal combustion engine, according to a second embodiment of the invention, is applied to an automotive gasoline engine.

FIG. 15 is a view showing a construction of a system, in which the control unit for a direct injection type internal combustion engine, according to the second embodiment of the invention, is applied to an automotive gasoline engine. In addition to the construction of the system of the first embodiment shown in FIG. 1, the present embodiment comprises an intake pressure sensor 19, which is a kind of intake pressure detectors to detect an intake pressure, provided in an appropriate position on an intake pipe 15.

Figure 16:
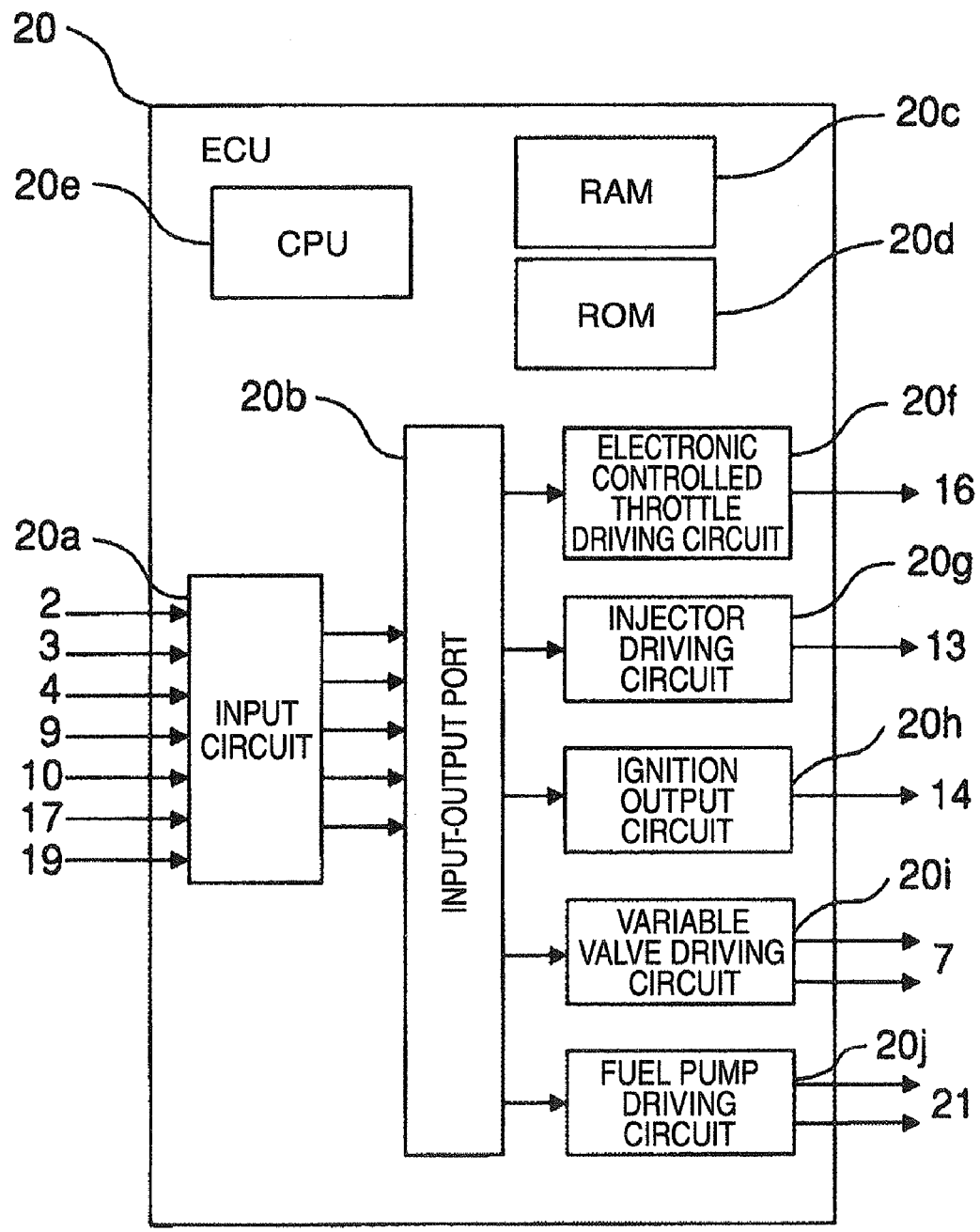
FIG. 16 is a block diagram showing the system, in which the control unit for a direct injection type internal combustion engine, according to the second embodiment of the invention, is applied to an automotive gasoline engine.

FIG. 16 is a block diagram showing a system, in which the control unit for a direct injection type internal combustion engine, according to the second embodiment of the invention, is applied to an automotive gasoline engine.

The present embodiment is fundamentally the same in construction as that of the control unit for a direct injection type internal combustion engine, according to the first embodiment of the invention, but it has a feature in that an output signal of the intake pressure sensor 19 is input into an input circuit 20a.

A control map for determination of the number of fuel split injections in the control unit for a direct injection type internal combustion engine, according to the embodiment, is the same as that shown in FIG. 3.

Figure 17:
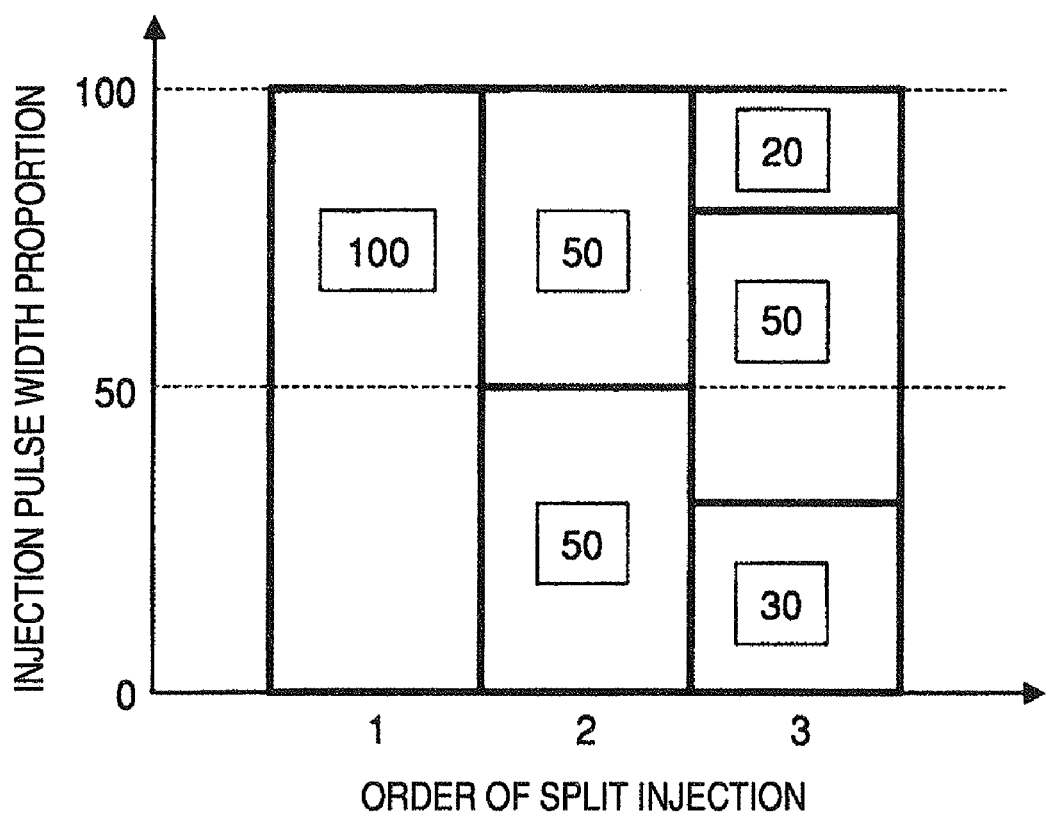
FIG. 17 is a view illustrating a control map for determination of proportions of injections in split injection in the characteristics of a control program in the control unit for a direct injection type internal combustion engine, according to the second embodiment of the invention.

FIG. 17 is a view illustrating a control map for determination of proportions of respective injections in split injection in the characteristics of the control program in the control unit for a direct injection type internal combustion engine, according to the second embodiment of the invention. The embodiment comprises a control map, in which a fuel is split and jetted in plural times from an injector 13 and the number of fuel split injections made optimum for respective operating conditions is set from a request torque calculated from an output signal of an accelerator opening degree sensor 2, a rotating speed of an engine 100 calculated from an output signal of a crank angle sensor 10, and fuel pressure calculated from an output signal of a fuel pressure sensor 20 (FIG. 3), and thereafter proportions of respective injections in split injection can be set. However, proportions of respective injections are not limited to those shown in FIG. 17 but may be set from an engine rotating speed and a request torque.

The characteristics of variable valves in the control unit for a direct injection type internal combustion engine, according to the embodiment, is the same as that shown in FIG. 5. Operating ranges in the control unit for a direct injection type internal combustion engine, according to the embodiment, are the same as those shown in FIG. 6. A representative example of setting of an intake valve and an exhaust valve in the operating ranges A, B, C, and D shown in FIG. 6, in the control unit for a direct injection type internal combustion engine, according to the embodiment, is the same as that shown in FIG. 7. A piston traveling speed $dx/d\theta$ per crank angle of a direct injection type internal combustion engine in the control unit for a direct injection type internal combustion engine, according to the embodiment, is the same as that shown in FIG. 8. The characteristics of the ratio $\alpha$ in the control unit for a direct injection type internal combustion engine, according to the embodiment, is the same as that shown in FIG. 9. The characteristics of the ratio $\alpha$ in the control unit for a direct injection type internal combustion engine, according to the embodiment, is the same as that shown in FIG. 10. A split injection control in the control unit for a direct injection type internal combustion engine, according to the embodiment, is the same as that shown in FIG. 11.

Subsequently, referring to FIG. 18, an explanation will be given to the contents of split injection control in the control unit for a direct injection type internal combustion engine, according to the embodiment.

Figure 18:
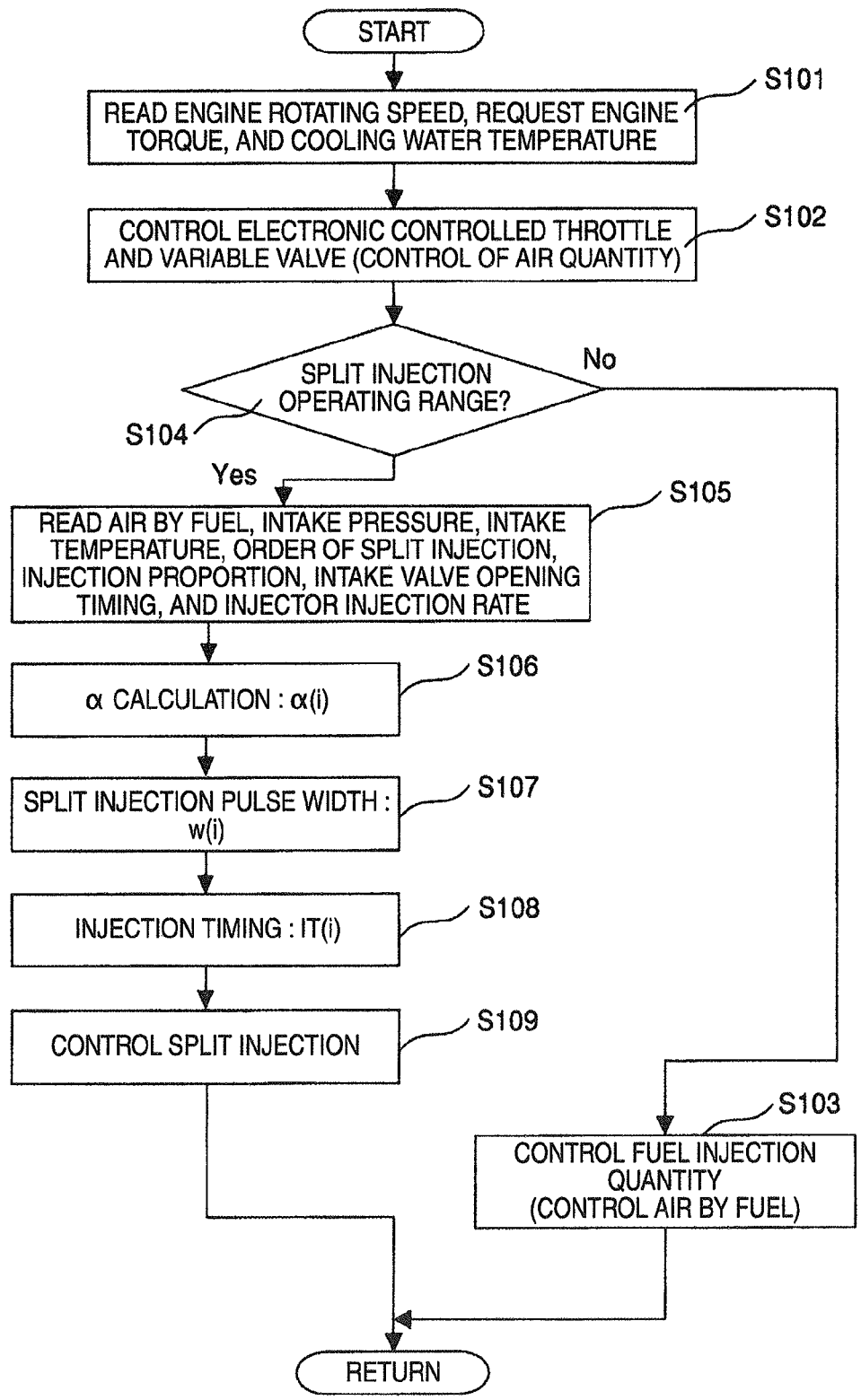
FIG. 18 is a flowchart showing the contents of control of split injection in the control unit for a direct injection type internal combustion engine, according to the second embodiment of the invention.

FIG. 18 is a flowchart showing the contents of control of split injection in the control unit for a direct injection type internal combustion engine, according to the second embodiment of the invention.

The contents of control shown in FIG. 18 are repeatedly carried out by the ECU 1 with a predetermined period.

The ECU 1 reads information (engine rotating speed, request engine torque, cooling water temperature, etc.) with respect to a present operating range in STEP S101. As described, the request engine torque is calculated on the basis of an output signal of the accelerator opening degree sensor 2.

Subsequently, an electronic controlled throttle and a variable valve are controlled on the basis of a present operating range in STEP S102 in a manner to realize an appropriate intake air quantity.

Subsequently, the ECU 1 determines whether a present operating range is a split injection operating range, from a map beforehand memorized, etc. in STEP S104.

In case of a split injection operating range, a target air by fuel, intake pressure, intake temperature, the order of split injection, respective injection proportions, an intake valve opening timing, and an injector injection rate at present are read in STEP S105. Hereupon, for the injector injection rate, that beforehand held in the ROM 20d is referred to.

Subsequently, the ECU 1 calculates the ratio $\alpha(i)$ in STEP S106. Specifically, the ratio $\alpha(i)$ is first calculated referring to the characteristics (FIGS. 9 and 10) of the ratio $\alpha$ beforehand stored from a target air by fuel, intake pressure, intake temperature, the order of split injection, respective injection proportions, an intake valve opening timing, and an injector injection rate at present, which have been read.

Subsequently, the ECU 1 calculates respective injection pulse widths w(i) in STEP S107. Specifically, the respective injection pulse widths w(i) are calculated from a target air by fuel, intake pressure, intake temperature, the order of split injection, and respective injection proportions at present, which have been read.

Subsequently, the ECU 1 calculates respective injection timings IT(i) of split injection in STEP S108. Specifically, a piston travel x(i) is calculated, according to the formula 1, from the ratio $\alpha(i)$ calculated in STEP S106 and the respective injection pulse widths w(i), a piston traveling speed $dx/d\theta$ (FIG. 8) beforehand stored, per crank angle of the internal combustion engine is referred, and timings, which separate the piston travel x(i), are calculated as respective injection timings IT(i).

While an example, in which the ratio $\alpha$ is calculated from a target air by fuel and an intake air quantity calculated from intake pressure and intake temperature, which are detected by the intake pressure sensor and the intake temperature sensor, is shown, an intake air quantity detected directly by an airflow sensor will do alternatively.

Subsequently, the ECU 1 controls split injection, in STEP S109, on the basis of injection pulse widths w(i) and injection timings IT(i), which are calculated in STEP S107 and STEP S108.

In contrast, in the case where it is determined in STEP S104 that an associated range is not a split injection range, control is terminated so as to generate a mixture of a desired air by fuel (mainly, stoichiometric proportion) in STEP S103, without performing a series of split injection controls for control of a fuel injection quantity.

Subsequently, referring to FIGS. 19, 20, and 21, a detailed explanation will be given to the contents of split injection control in the control unit for a direct injection type internal combustion engine, according to the embodiment.

Figure 19:
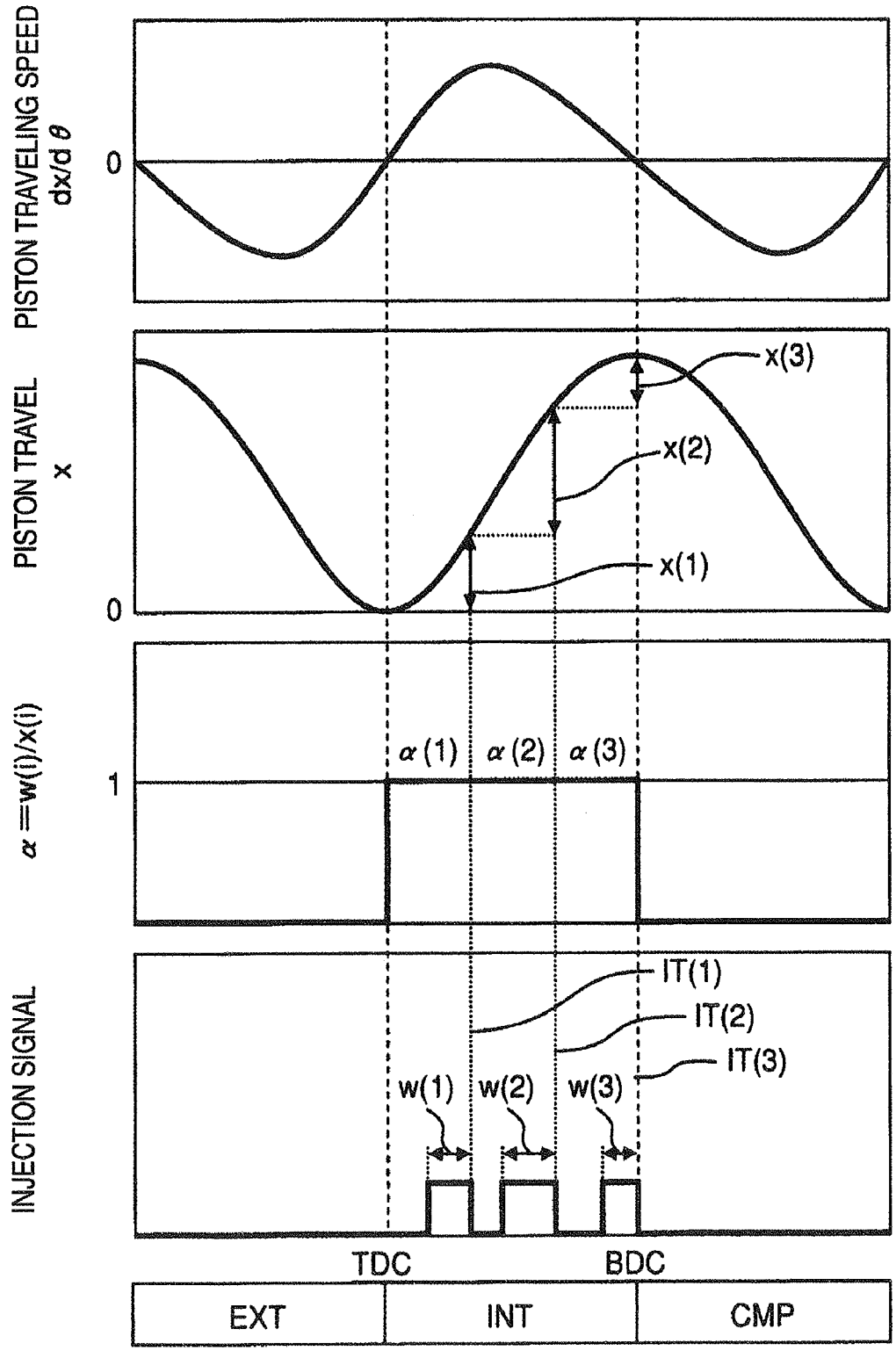
FIG. 19 is a view showing the relationship among the piston traveling speed dx/dθ, the piston travel x, the ratio α, and the injection signal, which drives an injector, in the case where the control unit for a direct injection type internal combustion engine, according to the second embodiment of the invention, performs three injections.

FIG. 19 shows the relationship among a piston traveling speed $dx/d\theta$, a piston travel x(i), the ratio $\alpha(i)$, and an injection signal, which drives an injector, in the case where the control unit for a direct injection type internal combustion engine, according to the second embodiment of the invention, performs three injections. For reference, a piston travel x(i) is shown. First, the ratio $\alpha(i)$ beforehand stored is calculated from the order of split injection, respective injection proportions, a target air by fuel, intake pressure, and intake temperature, which have been read. Thereafter, respective injection pulse widths w(i) are calculated from the target air by fuel, the intake pressure, the intake temperature, the order of split injection, and the respective injection proportions at present, which have been read. Subsequently, a piston travel x(i) is calculated, according to the formula 1, from the ratio $\alpha(i)$ and the respective injection pulse widths w(i), and thereafter timings, which separate the piston travel x(i), are calculated as respective injection timings IT(i).

Injection signals are output on the basis of the timings IT(i) and the injection pulse widths w(i) of respective injections in the split injection.

Figure 20:
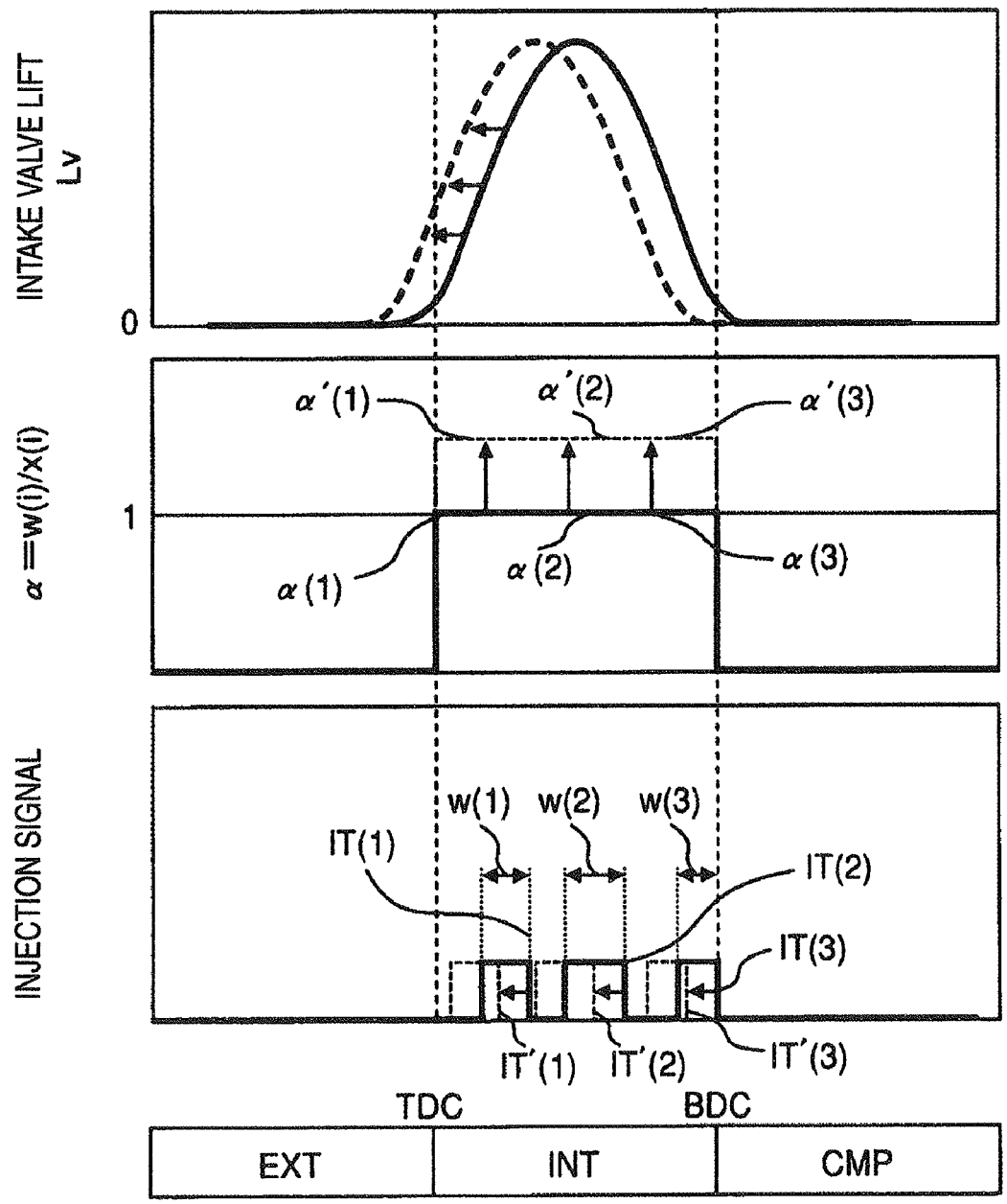
FIG. 20 shows the relationship among the intake valve lift, the ratio α, and the injection signal, which drives an injector, in the case where the control unit for a direct injection type internal combustion engine, according to the second embodiment of the invention, advances an intake valve opening timing.

FIG. 20 shows the relationship among the intake valve lift, the ratio $\alpha$, and the injection signal, which drives an injector, in the case where the control unit for a direct injection type internal combustion engine, according to the second embodiment of the invention, advances an intake valve opening timing. Solid lines indicate the case where an intake valve opening timing is lagged mostly and broken lines indicate the case where an intake valve opening timing is advanced.

In the case where an intake valve opening timing is advanced, the ratio $\alpha'(i)$ beforehand stored is calculated from the order of split injection, respective injection proportions, a target air by fuel, intake pressure, and intake temperature, which have been read. Thereafter, respective injection pulse widths w(i) are calculated from a target air by fuel, intake pressure, intake temperature, the order of split injection, and respective injection proportions at present, which have been read. Subsequently, a piston travel x'(i) is calculated, according to the formula 1, from the ratio $\alpha'(i)$ and the respective injection pulse widths w(i), and thereafter timings, which separate the piston travel x'(i), are calculated as respective injection timings IT'(i).

Hereupon, a feature resides in that the ratio α'(i) in the case where an intake valve opening timing is advanced is set to be equal to or larger than the ratio α(i) in the case where an intake valve opening timing is lagged mostly. Injection signals are output on the basis of the timings IT(i) and the injection pulse widths w(i) of split injection with the ratio α'(i) constant in a cycle. Thereby, since a fuel injection quantity conformed to an air quantity as sucked is supplied into a cylinder even in the case where an intake valve opening timing is advanced, it is possible to generate a mixture of a target air by fuel without local generation of a rich mixture in a cylinder.

Figure 21:
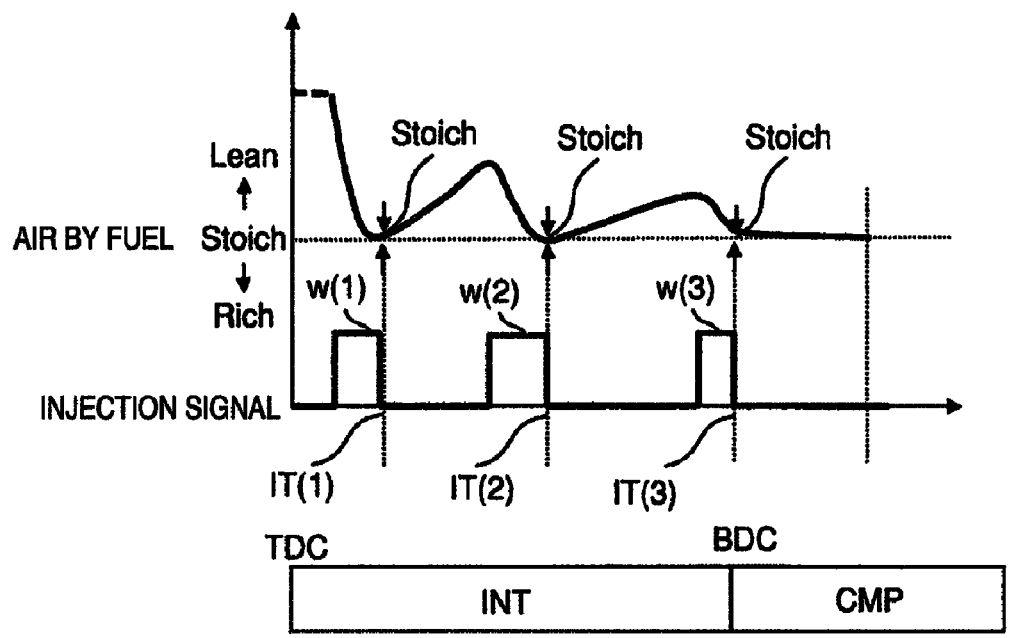
FIG. 21 is a view showing transition of an air by fuel of a mixture in a cylinder in intake stroke in the case where the control unit for a direct injection type internal combustion engine, according to the second embodiment of the invention, performs a split injection control with the α(i) constant in a cycle.

FIG. 21 shows transition of an air by fuel of a mixture in a cylinder in intake stroke in the case where the control unit for a direct injection type internal combustion engine, according to the second embodiment of the invention, performs a split injection control with the ratio α(i) constant in a cycle. This is the same as in the case where split injection control is performed with the ratio α'(i), which corresponds to the case where an intake valve opening timing is advanced, constant in a cycle.

In the case where split injection control is performed with the ratio α(i) constant in a cycle, an air by fuel in a cylinder becomes a target air by fuel (mainly, stoichiometric proportion) in timings of termination of respective injections.

For the above reason, by performing the split injection control with the ratio α(i) constant in a cycle, it is possible to generate a mixture of a target air by fuel without local generation of a rich mixture in a cylinder.

Figure 22:
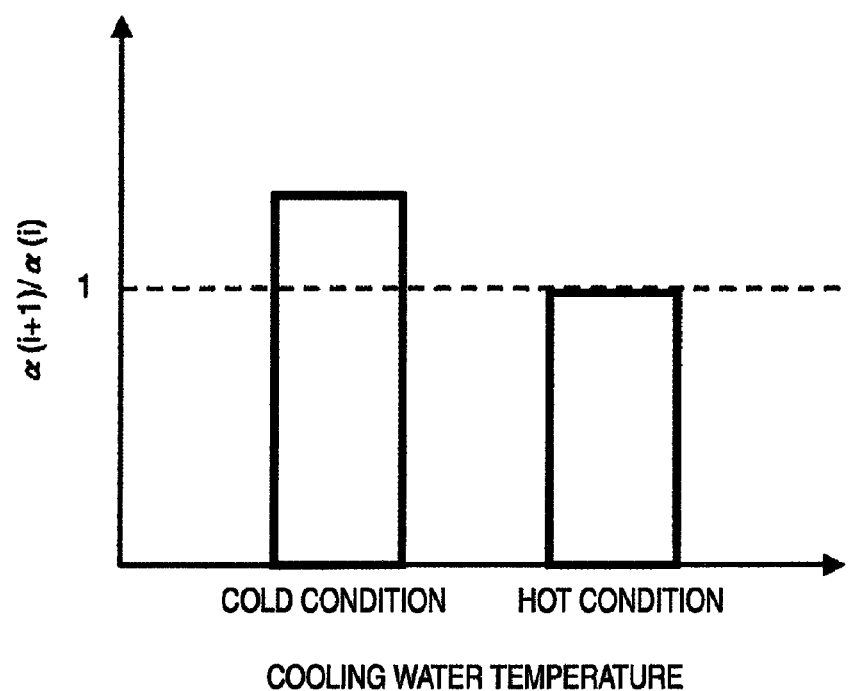
FIG. 22 is a view illustrating the characteristics of a ratio α of a piston travel from a point of time, at which a piston of an internal combustion engine is present at an intake top dead center, to the time of termination of first injection, and after the first injection, a piston travel x(i) (i denotes an order in split injections) from the time of termination of just preceding injection to the time of termination of associated injection, and an injection pulse width w(i) corresponding to the piston travel in a control unit for a direct injection type internal combustion engine, according to a third embodiment of the invention.
Figure 23:
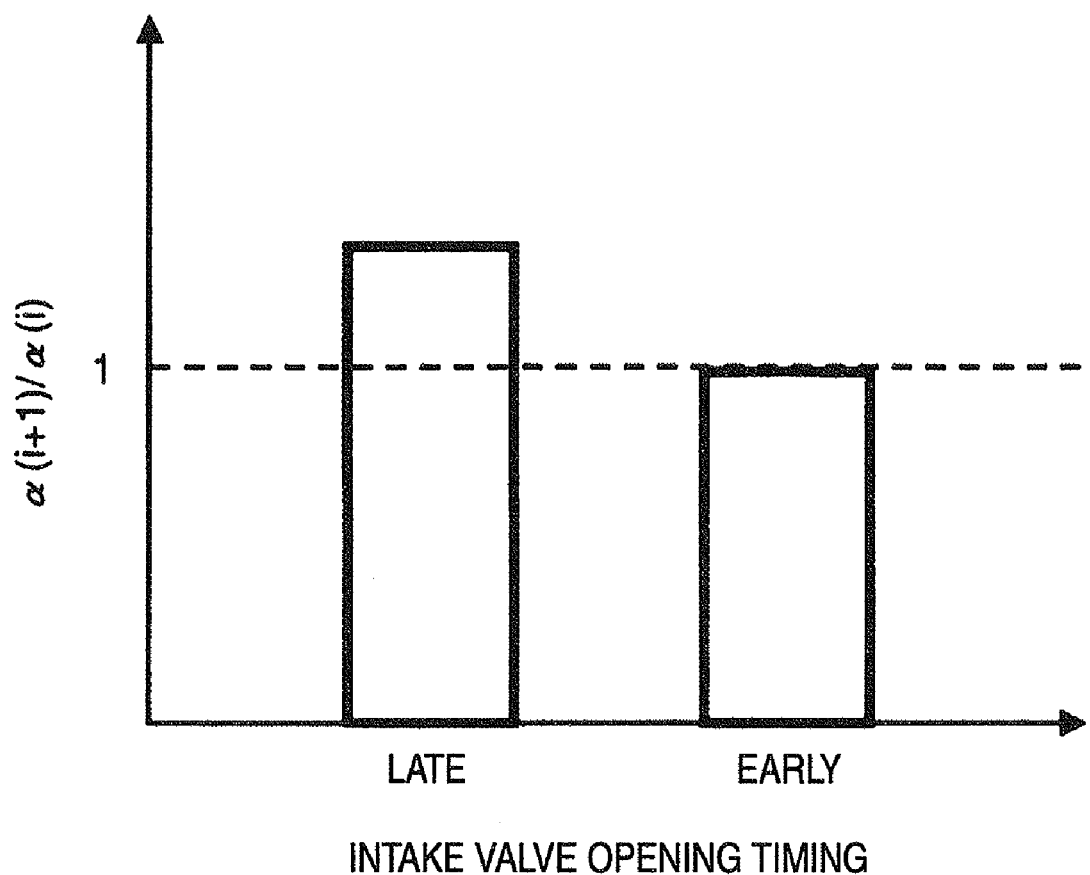
FIG. 23 is a view illustrating the characteristics of a ratio α of a piston travel from a point of time, at which a piston of an internal combustion engine is present at an intake top dead center, to the time of termination of first injection, and after the first injection, a piston travel x(i) (i denotes an order in split injections) from the time of termination of just preceding injection to the time of termination of associated injection, and an injection pulse width w(i) corresponding to the piston travel in the control unit for a direct injection type internal combustion engine, according to the third embodiment of the invention.

Referring to FIGS. 22 to 23, a control unit for a direct injection type internal combustion engine, according to a third embodiment of the invention, will be described with respect to construction and action.

The construction of a system, in which the control unit for a direct injection type internal combustion engine, according to the embodiment, is applied to an automotive gasoline engine, is the same as that shown in FIG. 1 or FIG. 15. A block diagram of the system, in which the control unit for a direct injection type internal combustion engine, according to the embodiment, is applied to an automotive gasoline engine, is the same as that shown in FIG. 2 or FIG. 16.

A control map for determination of number of fuel split injections in the control unit for a direct injection type internal combustion engine, according to the embodiment, is the same as that shown in FIG. 3. A view illustrating the control map for determination of proportions of respective injections in split injection in the characteristics of a control program in the control unit for a direct injection type internal combustion engine, according to the embodiment, is the same as that shown in FIG. 17.

FIG. 22 is a view illustrating the characteristics of the ratio α(i) in the control unit for a direct injection type internal combustion engine, according to the third embodiment of the invention. In FIG. 22, an axis of abscissa indicates a cold condition and a hot condition of the internal combustion engine. Here, the cold condition is one, in which a cooling water temperature of the internal combustion engine is substantially at most 60 degrees. An axis of ordinate indicates a ratio of the ratio α(i+1) of associated injection to the ratio α(i) of just preceding injection.

In the embodiment, the ratio of the ratio α(i+1) of associated injection to the ratio α(i) of just preceding injection is defined to be at least 1 when the internal combustion engine is in cold condition, and held in the ROM 20d shown in FIG. 2 or FIG. 16.

FIG. 23 is a view illustrating the characteristics of the ratio α(i) in the control unit for a direct injection type internal combustion engine, according to the third embodiment of the invention. In FIG. 23, an axis of abscissa indicates an intake valve opening timing of the internal combustion engine. Here, the case where an intake valve opening timing is early indicates the case where the intake valve opening timing is advanced relative to the set timing of an intake valve opening when the internal combustion engine is not operated, and the case where an intake valve opening timing is late indicates the case where the intake valve opening timing is lagged relative to the set timing of an intake valve opening when the internal combustion engine is not operated. An axis of ordinate indicates a ratio of the ratio α(i+1) of associated injection to the ratio α(i) of just preceding injection.

In the embodiment, the ratio of the ratio α(i+1) of associated injection to the ratio α(i) of just preceding injection is defined to be at least 1 when an intake valve opening timing of the internal combustion engine is put in the lag condition, and held in the ROM 20d shown in FIG. 2 or FIG. 16.

The characteristics of the variable valves in the control unit for a direct injection type internal combustion engine, according to the embodiment, is the same as that shown in FIG. 5. Operating ranges in the control unit for a direct injection type internal combustion engine, according to the embodiment, are the same as those shown in FIG. 6. A representative example of setting of an intake valve and an exhaust valve in the engine operating ranges A, B, C, and D shown in FIG. 6, in the control unit for a direct injection type internal combustion engine, according to the embodiment, is the same as that shown in FIG. 7. A piston traveling speed dx/dθ per crank angle of a direct injection type internal combustion engine in the control unit for a direct injection type internal combustion engine, according to the embodiment, is the same as that shown in FIG. 8. The characteristics of the ratio α in the control unit for a direct injection type internal combustion engine, according to the embodiment, is the same as that shown in FIG. 9. The characteristics of the ratio α in the control unit for a direct injection type internal combustion engine, according to the embodiment, is the same as that shown in FIG. 10. A split injection control in the control unit for a direct injection type internal combustion engine, according to the embodiment, is the same as that shown in FIG. 11.

Subsequently, referring to FIG. 24, an explanation will be given to the contents of split injection control in the control unit for a direct injection type internal combustion engine, according to the embodiment.

Figure 24:
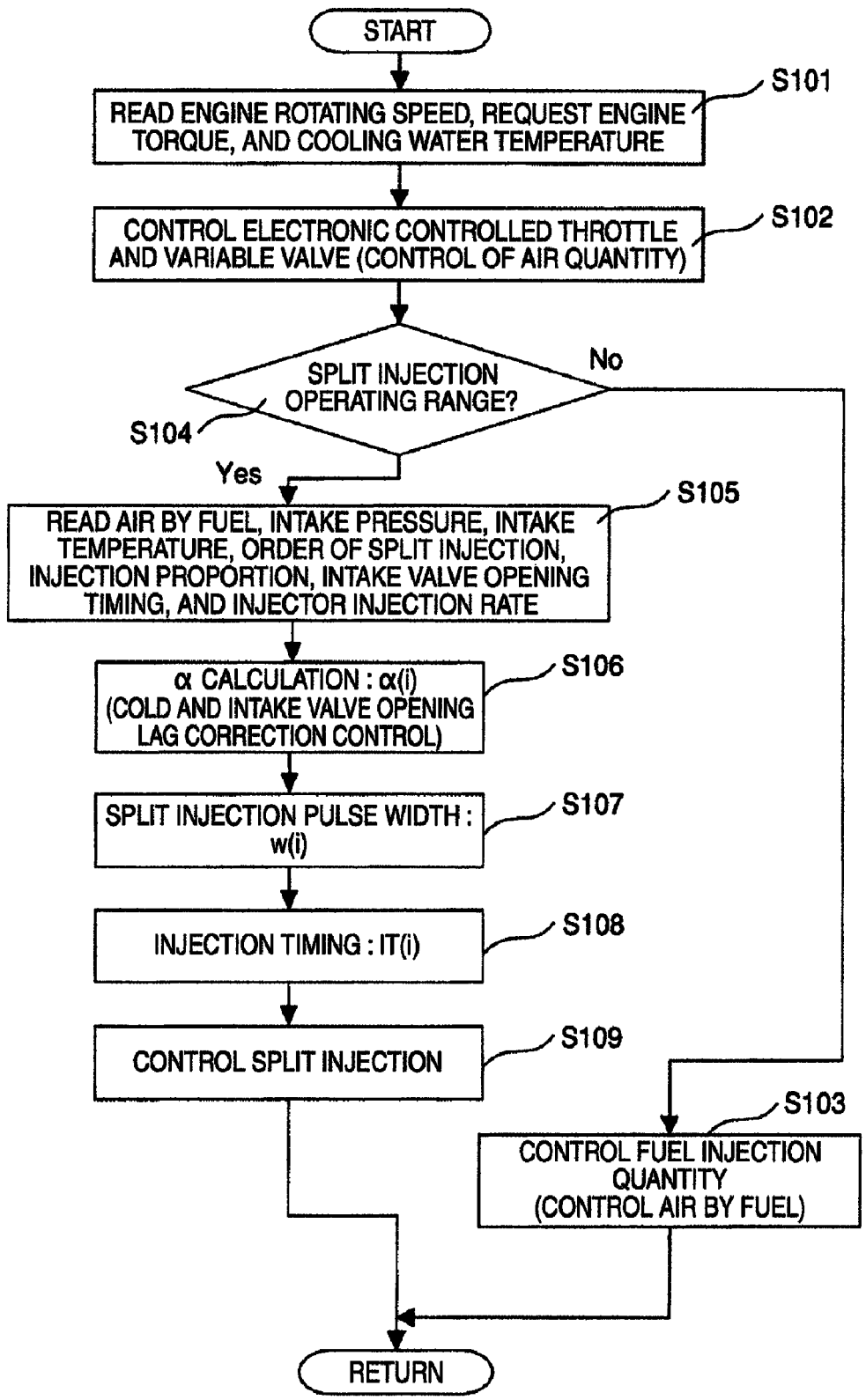
FIG. 24 is a flowchart showing the contents of control of split injection in the control unit for a direct injection type internal combustion engine, according to the third embodiment of the invention.

FIG. 24 is a flowchart showing the contents of control of split injection in the control unit for a direct injection type internal combustion engine, according to the third embodiment of the invention.

The contents of control shown in FIG. 24 are repeatedly carried out by the ECU 1 with a predetermined period.

The ECU 1 reads information (engine rotating speed, request engine torque, cooling water temperature, etc.) with respect to a present operating range in STEP S101. As described, the request engine torque is calculated on the basis of an output signal of the accelerator opening degree sensor 2.

Subsequently, an electronic controlled throttle and a variable valve are controlled on the basis of a present engine operating range in STEP S102 in a manner to realize an appropriate intake air quantity.

Subsequently, the ECU 1 determines whether a present operating range is a split injection operating range, from a map beforehand stored, etc. in STEP S104. In case of a split injection operating range, a target air by fuel, intake pressure, intake temperature, the order of split injection, respective injection proportions, an intake valve opening timing, and an injector injection rate at present are read in STEP S105. Hereupon, the injector injection rate beforehand held in the ROM 20d in FIG. 2 or FIG. 16 is referred to.

Subsequently, the ECU 1 calculates the ratio α(i) in STEP S106. Specifically, the ratio α(i) is first calculated referring to the characteristics (FIGS. 9 and 10) of the ratio α beforehand stored from a target air by fuel, intake pressure, intake temperature, the order of split injection, respective injection proportions, an intake valve opening timing, and an injector injection rate at present, which have been read. Thereafter, the ratio α'(i) is calculated by cold and intake valve opening lag correction control (FIGS. 22 and 23).

Subsequently, the ECU 1 calculates respective injection pulse widths w(i) in STEP S107. Specifically, the respective injection pulse widths w(i) are calculated from a target air by fuel, intake pressure, intake temperature, the order of split injection, and respective injection proportions at present, which have been read.

Subsequently, the ECU 1 calculates respective injection timings IT'(i) of split injection in STEP S108. Specifically, a piston travel x'(i) is calculated, according to the formula 1, from the ratio α'(i) calculated in STEP S106 and the respective injection pulse widths w(i), and then timings, which separate the piston travel x'(i), are calculated as respective injection timings IT'(i) referring to a piston traveling speed dx/dθ (FIG. 8), beforehand stored, per crank angle of the internal combustion engine.

While an example, in which the ratio α is calculated from a target air by fuel and an intake air quantity calculated from intake pressure and intake temperature, which are detected by the intake pressure sensor and the intake temperature sensor, is shown, an intake air quantity detected directly by an airflow sensor will do alternatively.

Subsequently, the ECU 1 controls split injection, in STEP S109, on the basis of injection pulse widths w(i) and injection timings IT'(i), which are calculated in STEP S107 and STEP S108.

In contrast, in the case where it is determined in STEP S104 that an associated range is not a split injection range, control is terminated so as to generate a mixture of a desired air by fuel (mainly, stoichiometric proportion) in STEP S103, without performing a series of split injection controls for control of a fuel injection quantity.

Subsequently, referring to FIGS. 25, 26, and 27, an explanation will be given in detail to the contents of split injection control in the control unit for a direct injection type internal combustion engine, according to the embodiment.

Figure 25:
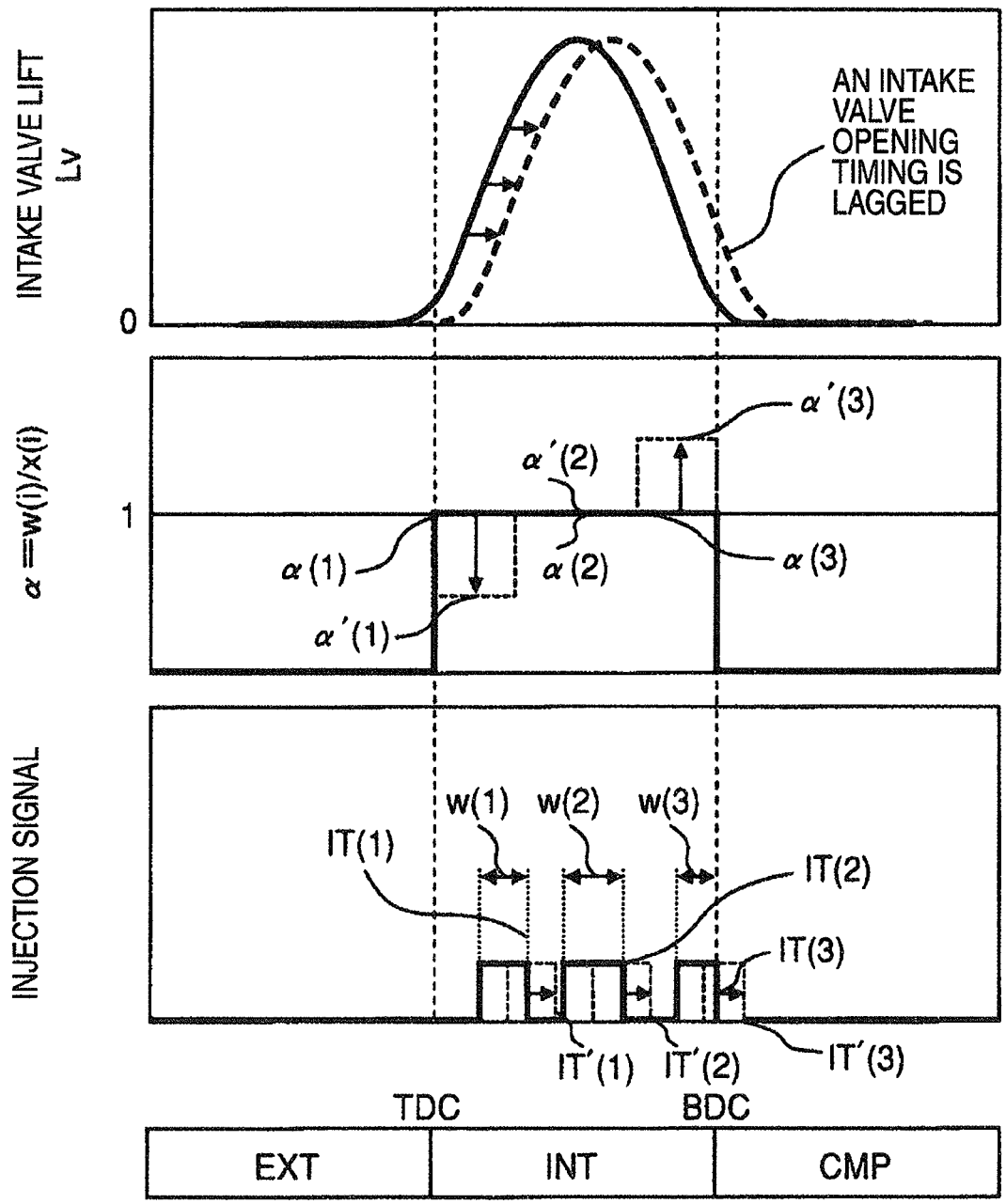
FIG. 25 is a view showing the relationship among the intake valve lift, the ratio α, and the injection signal, which drives an injector, in the case where the control unit for a direct injection type internal combustion engine, according to the third embodiment of the invention, causes an intake valve opening timing to lag.

FIG. 25 shows the relationship among the intake valve lift, the ratio α, and the injection signal, which drives an injector, in the case where the control unit for a direct injection type internal combustion engine, according to the third embodiment of the invention, causes an intake valve opening timing to be lagged. Solid lines indicate the case where an intake valve opening timing is advanced and broken lines indicate the case where an intake valve opening timing is lagged.

In the case where an intake valve opening timing is lagged, the ratio α'(i) beforehand stored is calculated from the order of split injection, respective injection proportions, a target air by fuel, intake pressure, and intake temperature, which have been read. Thereafter, respective injection pulse widths w(i) are calculated from a target air by fuel, intake pressure, intake temperature, the order of split injection, and respective injection proportions at present, which have been read. Subsequently, a piston travel x'(i) is calculated, according to the formula 1, from the ratio α'(i) and the respective injection pulse widths w(i), and then timings, which separate the piston travel x'(i), are calculated as respective injection timings IT'(i).

Here, the ratio α'(i) in the case where an intake valve opening timing is lagged has a feature in monotonously increasing in a cycle. Injection signals are output on the basis of the injection timings IT'(i), which are calculated from the monotonously increasing ratio α'(i), and the injection pulse widths w(i). Thereby, since a fuel injection quantity conformed to an air quantity as sucked is supplied into a cylinder even in the case where an intake valve opening timing is lagged, it is possible to generate a mixture of a target air by fuel without local generation of a rich mixture in a cylinder.

Figure 26:
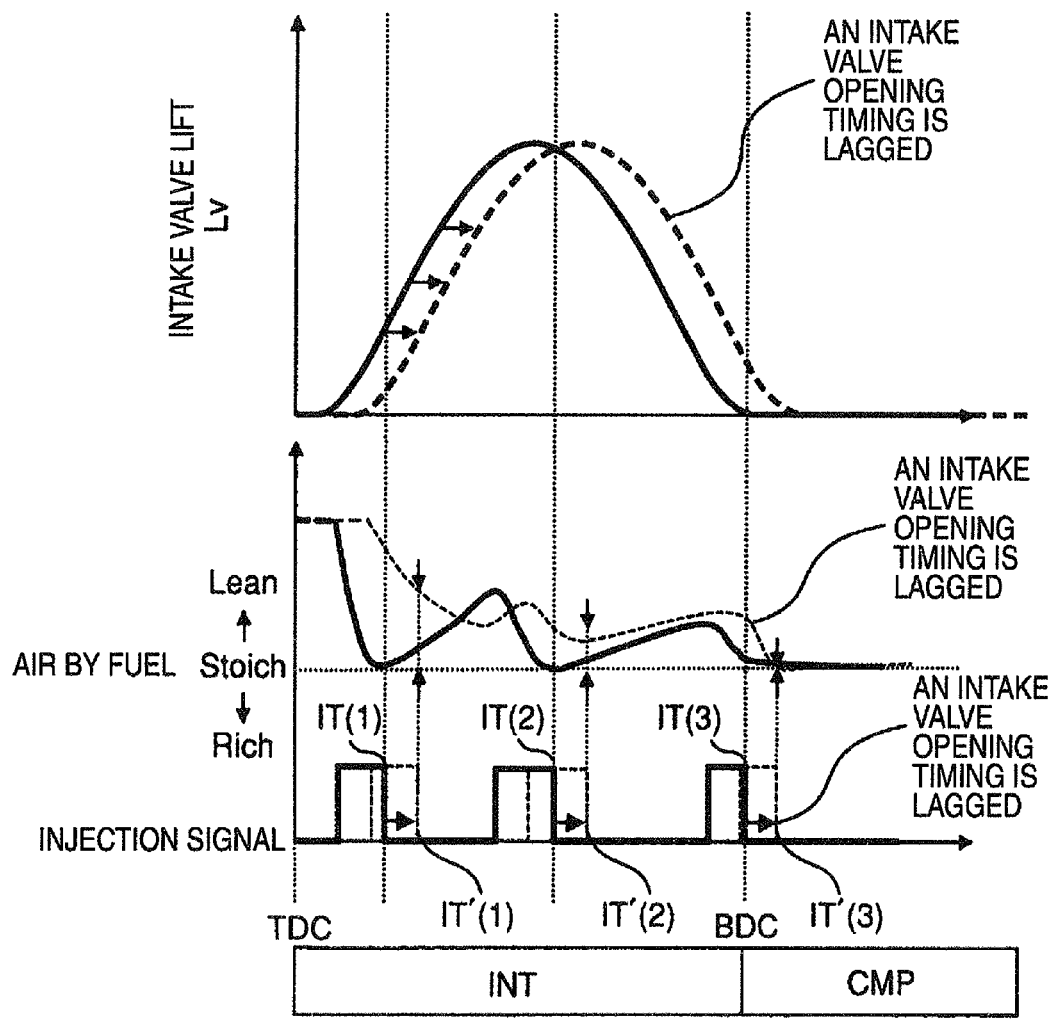
FIG. 26 is a view showing transition of an air by fuel of a mixture in a cylinder in intake stroke in the case where the control unit for a direct injection type internal combustion engine, according to the third embodiment of the invention, monotonously increases the ratio α(i) in a cycle to perform a split injection control when the internal combustion engine is in cold condition.

FIG. 26 shows transition of an air by fuel of a mixture in a cylinder in intake stroke in the case where the control unit for a direct injection type internal combustion engine, according to the third embodiment of the invention, monotonously increases the ratio α'(i) in a cycle to perform a split injection control when an intake valve opening timing of the internal combustion engine is caused to be lagged. For reference, there are shown an intake valve lift and actions of the intake valve lift in the case where an intake valve opening timing is lagged. Solid lines indicate the case where an intake valve opening timing is advanced and broken lines indicate the case where an intake valve opening timing is lagged.

In case of monotonously increasing the ratio α'(i) in a cycle to perform split injection control when an intake valve opening timing of the internal combustion engine is lagged, an air by fuel of a mixture in a cylinder approaches a target air by fuel (mainly, stoichiometric proportion) from a lean side in the duration from the timing of termination of first injection to the timing of termination of last injection and becomes the target air by fuel (mainly, stoichiometric proportion) in the timing of termination of last injection.

For the above reason, by monotonously increasing the ratio α'(i) in a cycle to perform split injection control, it is possible to generate a mixture of a target air by fuel without local generation of a rich mixture in a cylinder.

Figure 27:
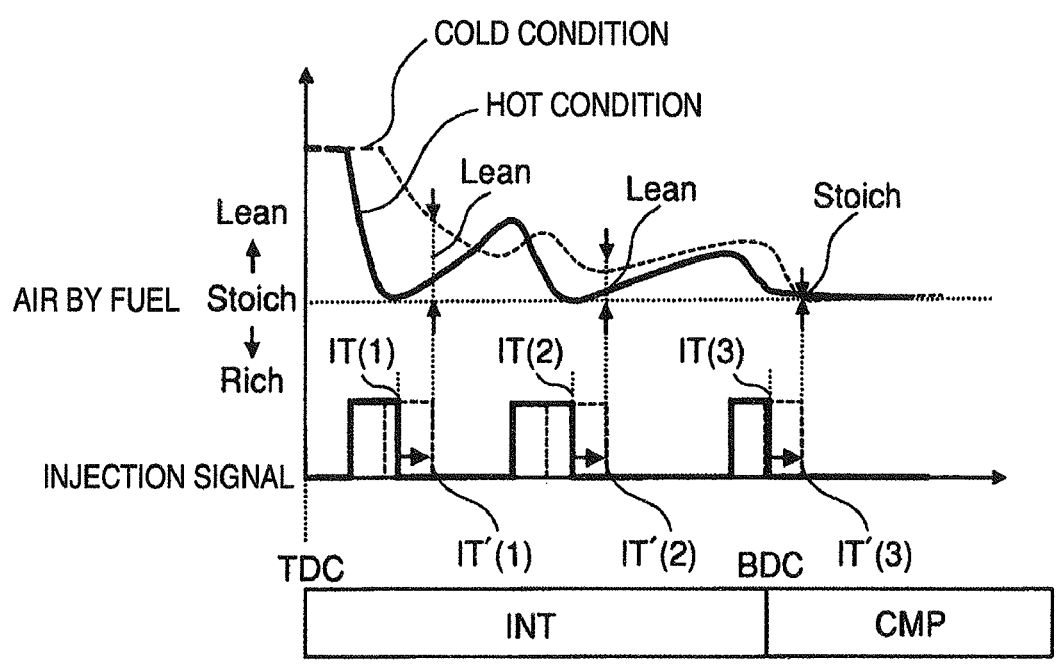
FIG. 27 is a view showing transition of an air by fuel of a mixture in a cylinder in intake stroke in the case where the control unit for a direct injection type internal combustion engine, according to the third embodiment of the invention, monotonously increases the ratio α(i) in a cycle to perform a split injection control when an intake valve opening timing of the internal combustion engine is caused to lag.

FIG. 27 shows transition of an air by fuel of a mixture in a cylinder in intake stroke in the case where the control unit for a direct injection type internal combustion engine, according to the third embodiment of the invention, monotonously increases the ratio α'(i) in a cycle to perform split injection control when the internal combustion engine is in cold condition. Solid lines indicate the case where the internal combustion engine is in hot condition and broken lines indicate the case where the internal combustion engine is in cold condition.

In case of monotonously increasing the ratio α'(i) in a cycle to perform split injection control when the internal combustion engine is in cold condition, an air by fuel of a mixture in a cylinder approaches a target air by fuel (mainly, stoichiometric proportion) from a lean side in the duration from the timing of termination of first injection to the timing of termination of last injection and becomes the target air by fuel (mainly, stoichiometric proportion) in the timing of termination of last injection. Thereby, since a fuel injection quantity conformed to an air quantity as sucked is supplied into a cylinder and fuel adhesion to an inner cylinder wall surface can be avoided, it is possible to generate a mixture of a target air by fuel without local generation of a rich mixture in a cylinder.

For the above reason, by monotonously increasing the ratio α'(i) in a cycle to perform split injection control, it is possible to generate a mixture of a target air by fuel without local generation of a rich mixture in a cylinder.

The embodiments have been described, but it is apparent to those skilled in the art that the present invention is not limited thereto and various variations and modifications may be made within the spirit of the present invention and the scope of the appended claims.

The invention claimed is:

1. A method of controlling a direct injection type internal combustion engine, in which a fuel is jetted plural times in an intake stroke, the method comprising:
    determining a fuel injection proportion as a ratio of an integrated fuel quantity at a time of termination of an arbitrary fuel injection to a total fuel injection quantity in the intake stroke,
    determining a piston travel proportion as a ratio of a piston travel from a top dead center at the time of termination of the arbitrary fuel injection with respect to a distance, over which a piston travels from the top dead center to a bottom dead center during the intake stroke, and
    controlling jetting of the fuel so that a ratio of the fuel injection quantity proportion and the piston travel proportion becomes constant in value.

2. The method according to claim 1, wherein the fuel injection quantity proportion becomes larger than a piston travel proportion immediately after termination of a last fuel injection out of fuel injections performed plural times.

3. A method of controlling a direct injection type internal combustion engine, in which a fuel is jetted plural times in an intake stroke, the method comprising:
    determining a fuel injection pulse width proportion as a ratio of an integrated fuel injection pulse width at a time of termination of an arbitrary fuel injection to a total fuel injection pulse width in the intake stroke,
    determining a piston travel proportion as a ratio of a piston travel from a top dead center at the time of termination of the arbitrary fuel injection to a distance, over which a piston travels from the top dead center to a bottom dead center during the intake stroke, and
    controlling jetting of the fuel so that a ratio of the fuel injection pulse width proportion and the piston travel proportion becomes constant in value.

4. The method according to claim 3, wherein the fuel injection pulse width proportion is made larger than the piston travel proportion when an opening timing of an intake valve is advanced.

5. The method according to claim 3, wherein the fuel injection pulse width proportion becomes larger than a piston travel proportion immediately after termination of a last fuel injection out of fuel injections performed plural times.

6. A method of controlling a direct injection type internal combustion engine, in which a fuel is jetted plural times in an intake stroke, the method comprising;
    determining when the internal combustion engine is in a cold condition, and
    controlling a fuel injection quantity so that, when the internal combustion engine is in the cold condition, a ratio of a piston travel from an intake top dead center to the time of termination of a first injection and an injection pulse width of the first injection, and, after the first injection, a ratio of a piston travel from the time of termination of just preceding injection to the time of termination of associated injection and an injection pulse width of the associated injection, monotonously increase in a cycle.

7. The method according to claim 6, further comprising controlling the fuel injection quantity so that when an opening timing of an intake valve is lagged, said ratio monotonously increases in the cycle.

\* \* \* \* \*